United States Patent
Portwood et al.

(10) Patent No.: US 6,679,342 B2
(45) Date of Patent: Jan. 20, 2004

(54) DUAL-SEAL DRILL BIT PRESSURE COMMUNICATION SYSTEM

(75) Inventors: Gary Ray Portwood, Kingwood, TX (US); Chris Edward Cawthorne, The Woodlands, TX (US); Robert Denton, Pearland, TX (US); Robert H. Slaughter, Jr., Ponca City, OK (US); Roger Didericksen, Ponca City, OK (US); Peter Cariveau, Stillwater, OK (US)

(73) Assignee: Smith International, Inc.

( * ) Notice: Subject to any disclaimer, the term of this patent is extended or adjusted under 35 U.S.C. 154(b) by 0 days.

(21) Appl. No.: 10/214,020

(22) Filed: Aug. 7, 2002

(65) Prior Publication Data

US 2003/0019666 A1 Jan. 30, 2003

Related U.S. Application Data

(60) Division of application No. 09/687,686, filed on Oct. 13, 2000, now Pat. No. 6,431,293, which is a division of application No. 09/201,614, filed on Nov. 30, 1998, now Pat. No. 6,196,339, which is a continuation-in-part of application No. 08/982,081, filed on Dec. 1, 1997, now Pat. No. 6,033, 117, which is a continuation-in-part of application No. 08/574,793, filed on Dec. 19, 1995, now abandoned

(60) Provisional application No. 60/067,149, filed on Dec. 2, 1997.

(51) Int. Cl.$^7$ .......................... E21B 10/00; F16C 33/72
(52) U.S. Cl. .................. 175/371; 175/227; 175/337; 175/372; 384/94; 277/336; 277/928
(58) Field of Search .................. 175/227, 337, 175/371, 372; 384/92, 93, 94; 277/336, 382, 936, 944, 910, 589, 500, 641, 642, 407

(56) References Cited

U.S. PATENT DOCUMENTS

| | | | |
|---|---|---|---|
| 3,656,764 A | 4/1972 | Robinson | 175/371 X |
| 3,746,405 A | 7/1973 | Welton | 308/8.2 |
| 3,964,554 A | 6/1976 | Ricks et al. | 175/359 |

(List continued on next page.)

FOREIGN PATENT DOCUMENTS

| | | | | |
|---|---|---|---|---|
| GB | 2022170 | | 12/1979 | 175/372 |
| GB | 2127071 | * | 4/1984 | 175/371 |

OTHER PUBLICATIONS

Joseph E. Shigley, "The Design and Selection of Mechanical Elements", Mechanical Engineering Design, 2$^{nd}$ Edition, 2–4,(1972)*.

Primary Examiner—Jong-Suk (James) Lee
(74) Attorney, Agent, or Firm—Conley Rose, P.C.

(57) ABSTRACT

A drill bit for use in a borehole at least partially containing drilling fluid includes a bit body having at least two bit components, including at least one leg, the leg having a journal segment, and a roller cone rotatably mounted upon the journal segment and forming at least one bearing cavity therebetween. Also included is an annular primary seal disposed between the leg and the roller cone, an annular secondary seal disposed between the leg and the roller cone and between the annular primary seal and the borehole and an annular space disposed between the annular primary seal and the annular secondary seal, the annular space at least partially containing fluid and being in substantially absolute fluid isolation from the bearing cavity and a conduit for permitting the flow of fluid from the annular space to the borehole. The annular secondary seal may be primarily elastomeric and a passage for permitting the flow of fluid may further permit the flow of fluid from the borehole to the annular space. The annular space may at least partially include a grease possessing a water washout value of under approximately 50% per ASTM D-4049 water spray test for lubrication characteristics and the grease may include a polymer tackifier of between approximately 1% and approximately 5% by weight.

13 Claims, 20 Drawing Sheets

U.S. PATENT DOCUMENTS

| | | | |
|---|---|---|---|
| 4,176,848 A | 12/1979 | Lafuze | 175/371 |
| 4,194,794 A | 3/1980 | Kling | 384/93 |
| 4,298,079 A | 11/1981 | Norlander et al. | 175/372 X |
| 4,316,515 A | 2/1982 | Pessier | 175/372 |
| 4,359,111 A | 11/1982 | Gonzalez | 277/390 X |
| 4,394,020 A | 7/1983 | Oelke | 277/306 |
| 4,448,268 A | 5/1984 | Fuller | 175/372 X |
| 4,466,622 A | 8/1984 | Deane et al. | 175/371 X |
| 4,515,228 A | 5/1985 | Dolezal et al. | 175/339 X |
| 4,516,641 A | 5/1985 | Burr | 175/372 X |
| 4,552,233 A | 11/1985 | Klima | 175/371 |
| 4,838,365 A | 6/1989 | Kotch | 175/371 |
| 4,880,068 A | 11/1989 | Bronson | 175/367 |
| 4,981,182 A | 1/1991 | Dysart | 175/71 |
| 5,027,911 A | 7/1991 | Dysart | 175/57 |
| 5,137,097 A | 8/1992 | Fernandez | 175/371 X |
| 5,360,076 A | 11/1994 | Kelly, Jr. et al. | 175/371 |
| 5,362,073 A * | 11/1994 | Upton et al. | 277/589 |
| 5,402,858 A | 4/1995 | Quantz et al. | 175/371 |
| 5,441,120 A | 8/1995 | Dysart | 175/228 |
| 5,513,711 A | 5/1996 | Williams | 175/57 |
| 5,518,077 A * | 5/1996 | Blackman et al. | 175/353 |
| 5,524,718 A | 6/1996 | Kirk et al. | 175/371 |
| 5,589,443 A | 12/1996 | Denton et al. | 508/150 |
| 5,793,719 A | 8/1998 | Gardner et al. | 369/44.23 |
| 5,842,700 A * | 12/1998 | Fang et al. | 277/336 |
| 5,842,701 A * | 12/1998 | Cawthorne et al. | 277/336 |
| RE36,452 E | 12/1999 | Upton et al. | 277/336 |
| 6,026,917 A | 2/2000 | Zahradnik et al. | 175/371 |
| 6,033,117 A | 3/2000 | Cariveau et al. | 384/94 |
| 6,109,376 A | 8/2000 | Pearce | 175/371 |
| 6,170,830 B1 * | 1/2001 | Cawthorne et al. | 277/336 |
| 6,176,330 B1 | 1/2001 | Burr | 175/371 |
| 6,179,296 B1 * | 1/2001 | Cawthorne et al. | 277/336 |
| 6,254,275 B1 | 7/2001 | Slaughter, Jr. et al. | 384/92 |
| 6,264,367 B1 | 7/2001 | Slaughter, Jr. et al. | 384/94 |
| 6,305,483 B1 * | 10/2001 | Portwood | 175/371 |
| 6,336,512 B1 | 1/2002 | Siracki et al. | 175/371 |

OTHER PUBLICATIONS

"Belleville Spring Washers", Design Handbook, Engineering Guide to Spring Design, Associated Spring Barnes Group, Inc., 5–12, (1987)*.

* cited by examiner

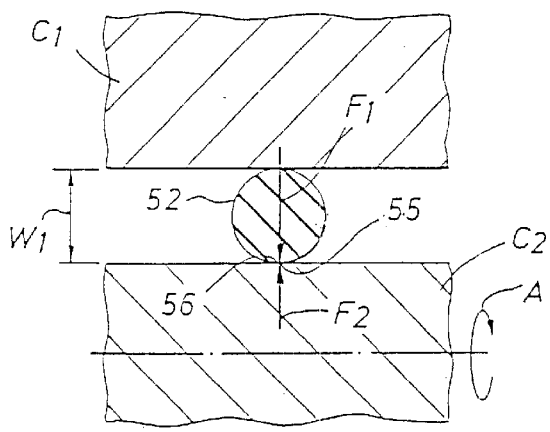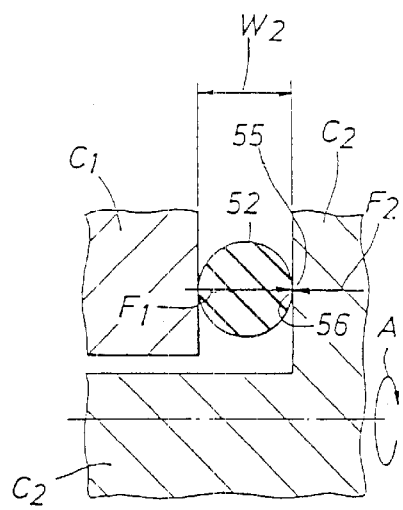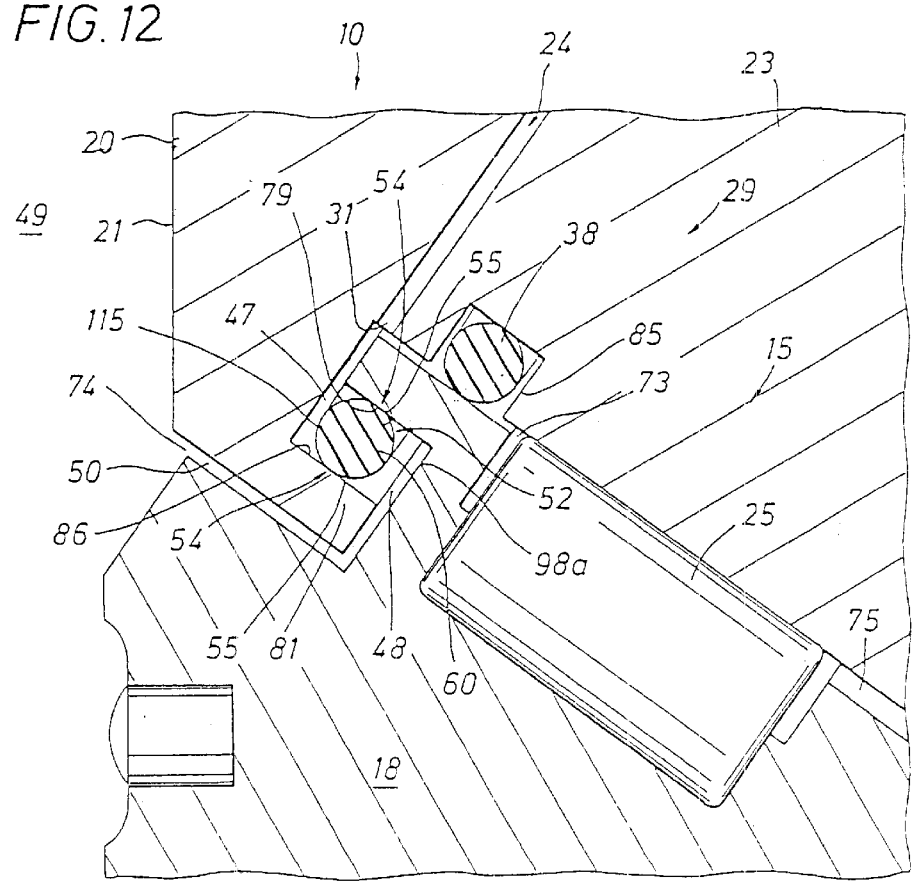

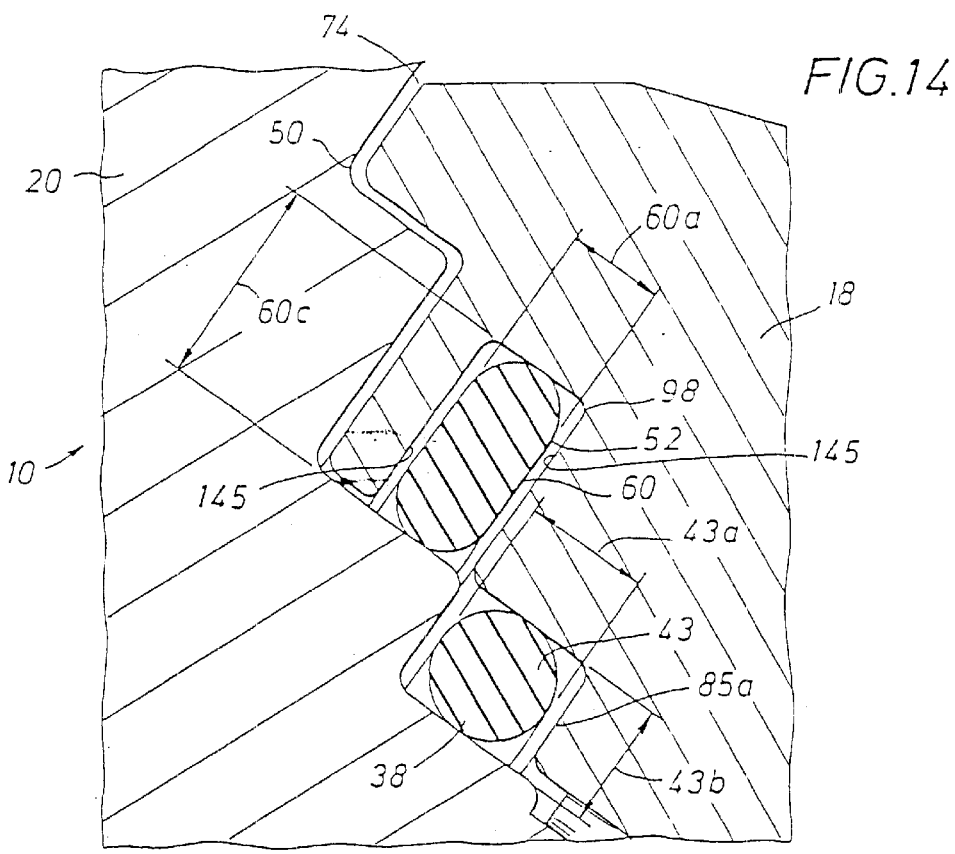
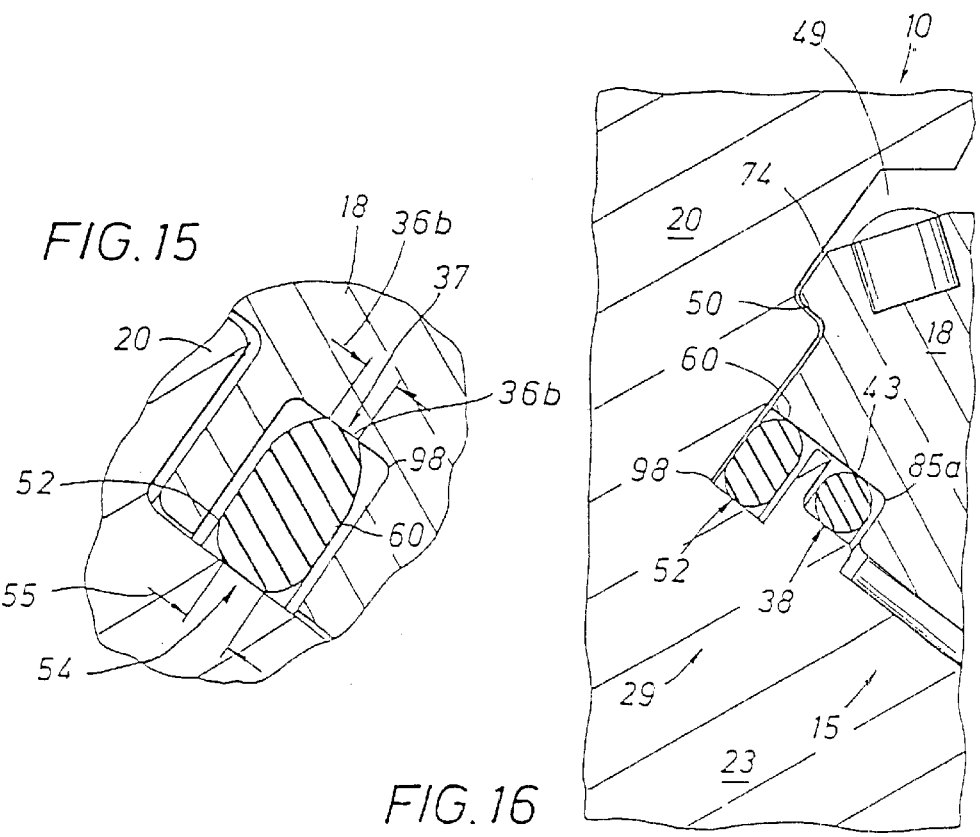

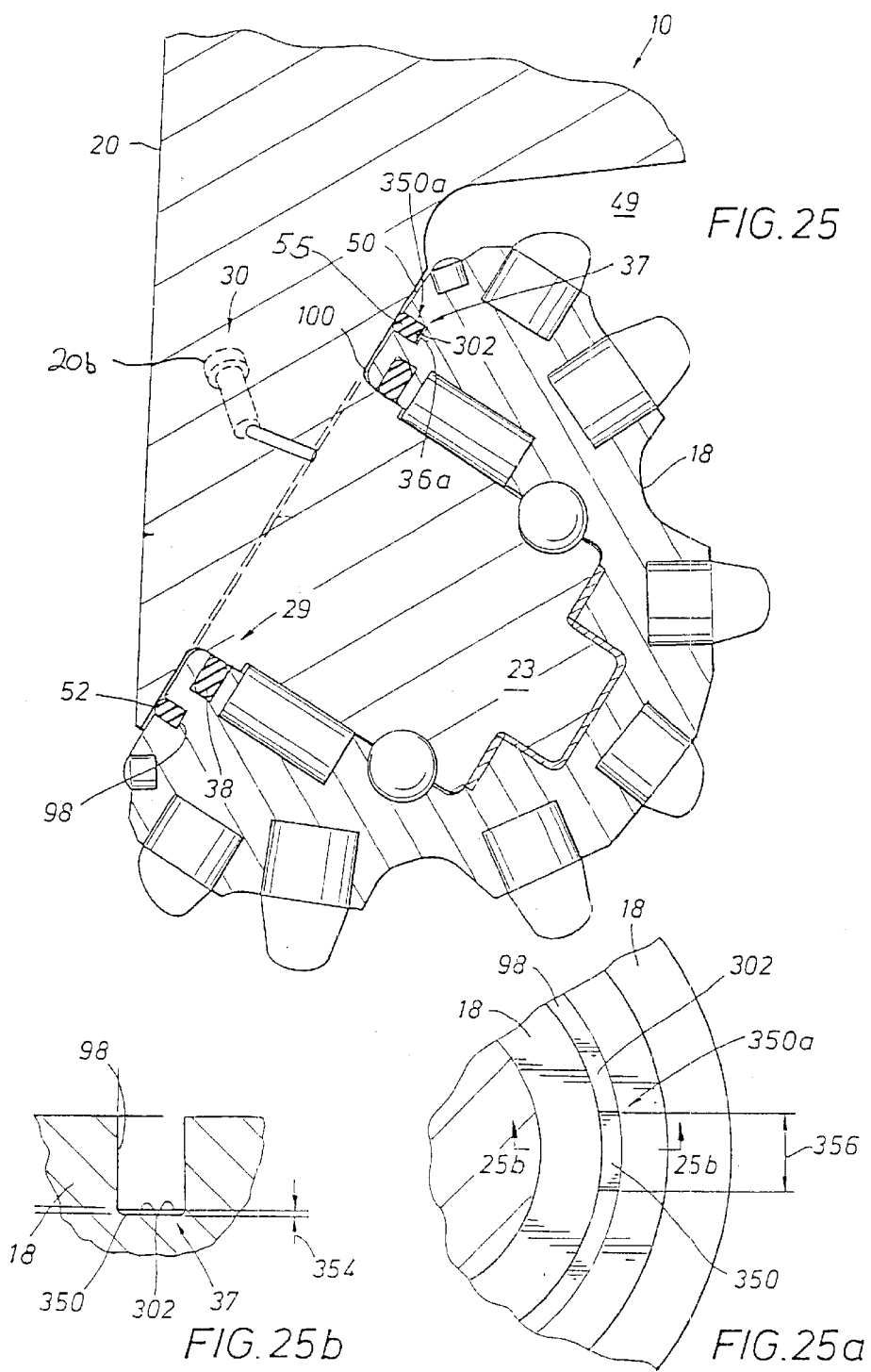

DUAL-SEAL DRILL BIT PRESSURE COMMUNICATION SYSTEM

CROSS-REFERENCE TO RELATED APPLICATIONS

This is a divisional application of pending U.S. patent application Ser. No. 09/687,686 filed Oct. 13, 2000, U.S. Pat. No. 6,431,293, which is a divisional of Ser. No. 09/201,614 filed Nov. 30, 1998, U.S. Pat. No. 6,196,339, which is a continuation-in-part application of U.S. patent application Ser. No. 08/982,081, filed Dec. 1, 1997, U.S. Pat. No. 6,033,117, and entitled "Sealed Bearing Drill Bit with Dual-Seal Configuration", which is a continuation-in-part of U.S. patent application Ser. No. 08/574,793, Dec. 19, 1995 entitled "Dual-Seal Drill Bit Pressure Communication System" now abandoned, and which claims the benefit of U.S. Provisional Application Serial No. 60/067,149 each of which are incorporated by reference herein in their entireties.

STATEMENT REGARDING FEDERALLY SPONSORED RESEARCH OR DEVELOPMENT

Not applicable.

BACKGROUND OF THE INVENTION

The present invention relates generally to sealed bearing earth boring drill bits, such as rotary cone rock bits. More particularly, the invention relates to drill bits that have a dual seal arrangement for protecting internal bearing elements. Yet more particularly, the present invention relates to providing for pressure communication between the interior and exterior of earth boring dual-seal drill bits.

During earthen drilling operations with the use of sealed bearing drill bits, such as rotary cone drill bits, it is necessary to protect the bearing elements of the bit from contamination in order to sustain bit operability. In particular, it is desirable to isolate and protect the bearing elements of the bit, such as bearings, bearing lubricant and bearing surfaces that are located in a bearing cavity or cavities between each corresponding bit leg and roller cone, from earthen cuttings, mud and other debris in the drilling environment. Introduction into the bearing system of such contaminants can lead to deterioration of the bearing lubricant, bearings and bearing surfaces, causing premature bit failure. It is well known in the art to provide an annular seal around the bearing elements to prevent contamination thereof by particles entering through the annular opening and into the gap that is formed between each leg and corresponding roller cone and that extends to the bearing cavity.

In a downhole drilling environment, the borehole contains "drilling fluid," which can be drilling mud, other liquids, air, other gases, or a mixture or combination thereof. In the typical liquid drilling environment of a petroleum well, the downhole fluid pressure at the location of the drill bit, the "external pressure," can be very high and fluctuating. At the same time, internal pressure within the bearing cavity, the "internal pressure," can also be very high and fluctuating due, for example, to thermal expansion and out-gassing of lubricant in the bearing cavity, and cone movement relative to the leg. These high pressure changes internal and external to the bearing cavity may cause a differential pressure across the bearing seal, thus resulting in a major load on the seal. When the internal pressure is greater than the external pressure, the seal may be drawn to and possibly extruded into the gap. Likewise, a greater external pressure can cause the seal to be drawn in the direction of the bearing cavity and possibly extruded therein. This may cause excessive wear to the seal and eventual bit inoperability. Furthermore, when the pressure differential reaches a certain level in each above scenario, the seal can leak, allowing lubricant to pass from the bearing cavity into the gap in the first scenario, and drilling fluid to pass from the gap into the bearing cavity in the second scenario.

Generally, when the internal pressure and the external pressure are equal, the differential pressure across the bearing cavity seal will be zero. There will be no pressure to force the drilling fluid or lubricant by the seal, or to force the seal into the gap or bearing cavity. Thus, it is generally desirable to achieve or maintain a differential pressure of approximately zero. In the prior art, a lubricant reservoir system having a flexible diaphragm located in a lubricant reservoir cavity in the bit leg is used to equalize the internal and external pressure. The flexible diaphragm separates the internal lubricant from the external drilling fluid and communicates the external pressure to the portion of the bearing seal adjacent to the bearing cavity. This type of pressure compensation system for a single seal bit is schematically shown in FIG. 1a.

Referring to FIG. 1a, when the external, or borehole, pressure Pd of the drilling fluid in the borehole $B_1$ increases and is greater than the internal pressure Pg in the bearing cavity, the seal $S_1$ will be forced inwardly toward the bearing cavity $B_2$. With the use of a flexible diaphragm $D_1$, the external pressure Pd is also applied to the diaphragm $D_1$, which transmits the pressure Pd, equalizing it with the internal pressure Pg. As a result, the pressure on both sides of the seal $S_1$ is balanced, preventing the occurrence of any differential pressure across the seal $S_1$. Similarly, when the pressure Pg increases, Pg will temporarily be larger than Pd, causing the diaphragm $D_1$ to expand outwardly to increase the internal volume of the bearing cavity $B_2$. As the internal volume increases, the internal pressure Pg will decrease. Pg will drop to equilibrium with Pd, and the internal volume will stop increasing.

Dual seal arrangements have been proposed having an outer seal around a primary inner seal. The purpose of including a second seal is typically to provide a second layer of protection from particles entering the gap through the annular opening. When an outer seal is added, it may be necessary, such as in drill bits used for petroleum wells, that the bit be capable of compensating for the differential pressure across both seals. FIG. 1b shows a two-seal schematic with both seals providing substantially absolute seals, the "space" Sp formed between the seals $S_1$, $S_2$ being completely filled with incompressible fluid, and there being no variation in the density of the incompressible fluid. In this scenario, the incompressible fluid in space $S_p$ between the seals $S_1$, $S_2$ acts like a rigid body that transmits pressure from $Pg_1$, which is the (internal) bearing cavity pressure, to Pd and from Pd to $Pg_1$. For example, when the external fluid pressure Pd increases, diaphragm $D_1$ will be pushed inwardly, causing the internal pressure $Pg_1$ to equal the external pressure Pd. Because the fluid between seals $S_1$ and $S_2$ is incompressible, it will transmit the increased pressure between $S_1$ and $S_2$ and neither seal $S_1$ or $S_2$ will be displaced.

However, during borehole drilling operations, such as with rotary cone sealed bearing drill bits, various factors will alter ideal conditions and require something more to equalize the differential pressure across both seals $S_1$ and $S_2$. For example, there is relative movement between the roller cone and bit leg, which causes the volume of the space $S_p$ between the seals $S_1$ and $S_2$ to significantly increase and decrease. A change in the volume of the space $S_p$ will change the chamber pressure $Pg_2$ in the space Sp, causing conditions where $Pg_2>Pd$, $Pg_1$ upon contraction of the space Sp, and where $Pg_2<Pd$, $Pg_1$ upon expansion of the space Sp. Thus, there will be differential pressures across both seals $S_1$, $S_2$, causing their movement and possible extrusion, which can cause accelerated seal wear and eventual bit failure.

Another potential factor altering ideal conditions is the thermal expansion, or out-gassing, of the incompressible fluid between the seals $S_1$, $S_2$ due to elevated temperatures within the bit. Referring to FIG. 1b, expansion of the incompressible fluid in the space Sp between the seals $S_1$, $S_2$ will elevate the chamber pressure $Pg_2$. Increasing the chamber pressure $Pg_2$ can cause a differential pressure across the seals $S_1$, $S_2$ such that $Pg_2>Pd$, $Pg_1$, which can result in accelerated wear and possible extrusion of seals $S_1$, $S_2$. Still another factor is the existence of air trapped in the space Sp between the seals $S_1$, $S_2$. In this instance, the mixture of air and fluid in space Sp is not incompressible. When external pressure Pd increases, $Pg_1$ will eventually equal Pd due to the diaphragm $D_1$, but $Pd>Pg_2$ and $Pg_1>Pg_2$ because of the presence of air in the space Sp between the seals $S_1$, $S_2$. The chamber pressure $Pg_2$ in the space Sp will not increase until the seals $S_1$, $S_2$ move closer together and the air volume in space Sp decreases. This differential pressure across seals $S_1$, $S_2$ will cause the movement and possible extrusion of the seals into the space Sp and excessive wear on the seals.

In the prior art, U.S. Pat. No. 5,441,120, which is hereby incorporated by reference herein in its entirety, discloses the use of an additional flexible diaphragm $D_2$, such as shown in FIG. 1c herein, to attempt to equalize, or balance the chamber pressure $Pg_2$ of the space Sp with the external pressure Pd or internal pressure $Pg_1$. Further increases in external pressure Pd will thereafter be transmitted through the fluid in the space Sp. Such a system has various disadvantages. For example, a system made in accordance with U.S. Pat. No. 5,441,120 requires or occupies much space within the bit leg, structurally weakening the bit. For another example, such a system does not allow for pressure relief from the space Sp, such as caused by thermal expansion and outgassing of the incompressible fluid between the seals $S_1$, $S_2$, which can cause damage to the seals as described above. It should be understood that there are other disadvantages and features of the disclosure of U.S. Pat. No. 5,441,120 as well as various features of the invention of each claim herein that distinguish one from the other. Thus, in any comparison, the disclosure of U.S. Pat. No. 5,441,120 should be compared as a whole to the claimed invention of any particular claim herein as a whole to distinguish them.

U.S. Pat. Nos. 4,981,182 and 5,027,911, which are also hereby incorporated herein in their entireties, disclose various embodiments of drill bits including inner and outer seals and where lubricant is bled out of the bit past the outer seal to prevent drilling debris from accumulating and damaging the inner and outer seals. In some such embodiments, passages in the bit allow lubricant to travel from the bearing cavity to the space between the seals. In other embodiments, a hydrodynamic inner seal is used, which allows the leakage of lubricant from the bearing cavity to the space between the seals. In both instances, the pressure of the lubricant presumably forces the outer seal to open and allow the bleeding of lubricant from the bit. These systems also have various disadvantages. For example, the continuous bleeding of lubricant past the outer seal (particularly if the outer seal fails) can lead to the depletion of bearing lubricant in the bit, and cause bearing and bit damage due to a lack of lubricant.

For another example, if the space between the seals in such configurations is not filled with lubricant, such as which will occur if there is a decrease or stoppage in the flow of lubricant from the bearing cavity to the space, a high pressure differential across the seals can result, causing damage to the seals as described above. For yet another example, with many such embodiments, because the space between the seals and the bearing cavity are in fluid communication, there exists the possibility that debris or drilling fluid bypassing the outer seal, such as when the outer seal fails, will move through the space between the seals and into the bearing cavity, causing contamination and damage to therein and to the bearing elements. It should be understood that there are other disadvantages and features of the disclosures of U.S. Pat. Nos. 4,981,182 and 5,027,911 as well as various features of the invention of each claim herein that distinguish them. Thus, in any comparison of U.S. Pat. Nos. 4,981,182 or 5,027,911 and any claim herein, such disclosure should be compared as a whole to the claim as a whole to distinguish them.

Thus, there remains a need for improved techniques and mechanisms for substantially balancing or minimizing the pressure differential upon the primary and secondary seals of a dual seal configuration, particularly by allowing pressure communication between the interior and exterior of the drill bit. Ideally, the devices and techniques will accommodate cone movement, thermal expansion of the fluid and/or out-gassing between the primary and secondary seals, and trapped air in the space between the seals. Especially well received would be pressure communication devices that do not require substantial additional components, large space requirements in the bit, or highly complex manufacturing requirements for the bit. Also well received would be a pressure communication technique and device that will prevent the pressure differential across the dual seals from exceeding an upper limit, such as, for example, 100 psi. It would also be advantageous to include the use of an incompressible fluid having the capabilities of retaining sufficient viscosity to act as a medium for the transmission of energy between the primary and secondary seals, of retaining its lubrication properties, and/or of slowing the intrusion of abrasive particles to the primary seal—when and after the incompressible fluid is exposed to drilling fluid. These and other needs in the art will become apparent to those of skill in the art upon review of this patent specification, claims and drawings.

BRIEF SUMMARY OF THE INVENTION

In accordance with the present invention, there is provided techniques, methods and apparatuses for communicating fluid pressure between a borehole and the space between the seals of a dual-seal drill bit. The invention includes a drill bit for use in a borehole at least partially containing drilling fluid, including a bit body having at least two bit components, the bit components including at least one leg, the leg having a journal segment, the bit components further including a roller cone rotatably mounted upon the journal segment and forming at least one bearing cavity therebetween. The drill bit also includes an annular primary seal disposed between the leg and the roller cone and an annular secondary seal disposed between the leg and the roller cone and between the annular primary seal and the borehole. The annular secondary seal may be primarily elastomeric, may be primarily axially or radially energized, and/or may be disposed in an annular groove formed in one of the bit components or an annular interstice formed between the leg and the roller cone.

An annular space is disposed between the annular primary seal and the annular secondary seal. The annular space may at least partially contain fluid and may be in substantially absolute fluid isolation from the bearing cavity. The annular space may at least partially include a grease possessing a water washout value of under approximately 50% per ASTM D-4049 water spray test for lubrication characteristics, the grease including a polymer tackifier of between approximately 1% and approximately 5% by weight.

In one aspect of the invention, there is include means for permitting the flow of fluid from the annular space to the borehole. The drill bit can be configured such that the means further permits the flow of fluid from the borehole to the annular space. The means can be integral with the annular secondary seal, integral with at least one of the bit components or a combination thereof.

In another aspect of the invention, a first contact pressure occurs at the primarily dynamic sealing surface of the annular primary seal and a second contact pressure occurs at the primarily dynamic sealing surface of the annular secondary seal, the first contact pressure being greater than the second contact pressure. In yet another aspect of the invention, the annular secondary seal includes a primarily dynamic sealing surface and a primarily static sealing surface, wherein a first contact pressure occurs at the primarily dynamic sealing surface and a second contact pressure occurs at the primarily static sealing surface, the first contact pressure and the second contact pressure being unequal. In still another aspect of the invention, the annular secondary seal includes a sealing surface engageable with one of the bit components, wherein the sealing surface includes first and second regions. A first contact pressure occurs at the first region of the sealing surface and a second contact pressure occurs at the second region of the sealing surface, the first contact pressure being greater than the second contact pressure.

In accordance with another aspect of the invention, the annular space has a chamber pressure which may be altered by allowing the passage of fluid from the annular space to the borehole and from the borehole to the annular space. In a variation of this aspect, when a differential pressure occurs between the chamber pressure and the borehole pressure, the chamber pressure may be altered when the differential pressure is between approximately 0 psi and approximately 100 psi; and, in another variation, between approximately 30 psi and approximately 70 psi.

In another aspect of the invention, the bit may be designed so that fluid migrates from the annular space to the borehole when the chamber pressure is greater than the borehole pressure. The bit may be further designed so that fluid migrates from the borehole to the annular space when the borehole pressure is greater than the chamber pressure. In another aspect, the annular secondary seal includes first and second side surfaces adjacent to the sealing surface, and at least one of the bit components includes at least one non-energizing surface at least partially engageable with one of the first and second side surfaces of the annular secondary seal. The non-energizing surface of the bit component includes first and second regions, the first region of the non-energizing surface being uneven with respect to the second region of the non-energizing surface. Further, the first region of the non-energizing surface may include at least one surface feature.

In still another aspect of the invention, the annular secondary has a sealing surface engageable with at least one bit component, the sealing surface having first and second adjacent regions, wherein the thickness of the annular secondary seal at the first region of the sealing surface is greater than the thickness of the annular secondary seal at the second region of the sealing surface. In yet another aspect, the annular secondary seal includes at least one region having a tapered cross-section, or the cross-section of the entire annular secondary seal is tapered. Still, a further aspect of the invention includes an annular secondary seal including at least one region having an at least partially non-symmetrical cross-section.

In another aspect, the annular secondary seal including at least first and second circumferentially adjacent regions, a primarily static sealing surface and a primarily dynamic sealing surface. Each of the first and second circumferentially adjacent regions has a height measured between the primarily static and primarily dynamic sealing surfaces. Further, at least one of the static and dynamic sealing surfaces is at least partially disposed on the first and second circumferentially adjacent regions, the height of the first circumferentially adjacent region being greater than the height of the second circumferentially adjacent region.

In another aspect, at least one of the bit components includes an annular groove having first and second circumferentially adjacent regions, wherein the width of the first circumferentially adjacent region is greater than the width of the second circumferentially adjacent region and the annular secondary seal is disposed within the annular groove. In still another aspect, the bit components include first and second primarily non-energizing seal engagement surfaces and the annular secondary seal has first and second sides engageable with the first and second primarily non-energizing seal engagement surfaces of the bit components, respectively. At least one of the first and second primarily non-energizing seal engagement surfaces of the bit components includes first and second regions, the first region including at least one cut-out.

In accordance with one aspect of the present invention, the bit components include first and second primarily non-energizing seal engagement surfaces and the annular secondary seal having first and second sides engageable with the first and second primarily non-energizing seal engagement surfaces of the bit components, respectively. At least one of the first and second primarily non-energizing seal engagement surfaces of the bit components includes first and second regions, the first region being uneven with respect to the second region.

In another aspect, at least one of the bit components includes an annular groove and the annular secondary seal has first and second sides and being disposed within the annular groove. The annular groove includes a first primarily non-energizing surface engageable with the first side of the annular secondary seal and a second primarily non-energizing surface engageable with the second side of the annular secondary seal, the first primarily non-energizing surface disposed between the second primarily non-energizing surface and the bearing cavity. Further, the second primarily non-energizing surface includes at least first and second circumferentially adjacent regions, the first region of the second primarily non-energizing surface including at least one cut-out, whereby the distance from the first region of the second primarily non-energizing surface to the first primarily non-energizing surface is greater than the distance from the second region of the second primarily non-energizing surface to the first primarily non-energizing surface.

In still a further aspect of the invention, the annular secondary seal includes first and second circumferentially adjacent regions and a sealing surface extending at least partially upon the first and second circumferentially adjacent regions, wherein the sealing surface of the first circumferentially adjacent region is uneven with respect to the sealing surface of the second circumferentially adjacent region.

In still a further aspect, the leg and roller cone each include at least one component surface engageable with the annular secondary seal, at least one such component surface including first and second adjacent regions, wherein the first region of the component surface is uneven with respect to the second region of the component surface. In still another aspect, at least one of the bit components includes an annular groove having at least first and second circumferentially adjacent regions, the depth of the first circumferentially adjacent region being greater than the depth of the circumferentially adjacent second region and the annular secondary seal being disposed within the annular groove. Another aspect includes an annular interstice formed between the bit components, the annular interstice having at least one seal engagement surface, the seal engagement surface having first and second circumferentially adjacent regions. The depth of the first circumferentially adjacent region of the seal engagement surface is greater than the depth of the second circumferentially adjacent region and the annular secondary seal is disposed within the annular interstice.

In accordance with another aspect of the present invention, the annular secondary seal includes a primarily dynamic sealing surface and a primarily static sealing surface, each of the primarily dynamic and static sealing surfaces engageable with one of the bit components. At least a portion of at least one of the primarily dynamic and static sealing surfaces includes a non-elastomeric porous inlay capable of at least partially allowing the passage of fluid past the annular secondary seal when the portion of at least one of the sealing surfaces is engaged with the bit component.

In still a further aspect, the drill bit has an opening in the exterior surface of the leg and a passage disposed in the leg and extending from the opening to the annular space, the passage allowing fluid communication between the annular space and the borehole. In a variation of this aspect, a plurality of passages may be disposed in the leg and extend from the opening to the annular space. The passage may be capable of allowing the flow of fluid from the annular space to the borehole and from the borehole to the annular space. A fluid control member may be disposed in the leg in fluid communication with the passage. The fluid control member may be a two-way valve, or a primarily one-way fluid valve capable of allowing the flow of fluid from the annular space to the borehole. The annular space may be filled with incompressible fluid through the passage. The annular space may be at least partially includes a grease possessing a water washout value of under approximately 50% per ASTM D-4049 water spray test for lubrication characteristics, the grease including a polymer tackifier of between approximately 1% and approximately 5% by weight.

In another aspect the annular primary seal may form a substantially absolute seal and the annular space in substantially absolute fluid isolation from the bearing cavity. An opening is disposed in the exterior surface of the leg and a passage is disposed in the leg and extending from the opening to the annular space. The passage is filled with incompressible fluid and a plug is disposed in the opening.

Another aspect of the invention involves at least one of the bit components including at least two seal engagement surfaces, the annular secondary seal including a primarily dynamic sealing surface and a primarily static sealing surface, each the sealing surface of the annular secondary seal having a width and being engageable at the width with one of the seal engagement surfaces of the bit components. At least one of the annular primarily dynamic and primarily static sealing surfaces includes first and second regions, the width of the first region being smaller than the width of the second region.

Still, a further aspect of the invention includes an incompressible fluid for use to lubricate a seal in a sealed bearing drill bit, the drill bit useful in a borehole at least partially containing drilling fluid and solid particles, including a grease capable of lubricating at least one seal after the grease contacts drilling fluid. The grease may further capable of trapping solid particles to assist in preventing the ingress of solid particles to the seal, and/or transmitting energy between first and second seals after the grease contacts drilling fluid. The grease may be disposed between a primary seal and a secondary seal. The grease may possess a water washout value of under approximately 50% per ASTM D-4049 water spray test for lubrication characteristics. 30% per ASTM D-4049 water spray test for lubrication characteristics, and/or a polymer tackifier of between approximately 1% and approximately 5% by weight. The grease may include between approximately 10 percent and approximately 30 percent by weight of at least one mineral oil and between approximately 70 percent and approximately 90 percent by weight of at least one synthetic oil, and/or between approximately 1.0 percent and approximately 10.0 percent by weight of silica thickener and between approximately 1.0 percent and approximately 5.0 percent by weight of tackifier.

Accordingly, the present inventions comprise various combinations of features and advantages which enable it to substantially advance the technology associated with dual-seal pressure communication techniques and apparatuses. Each of these aspects of the invention, which may be used alone or in a combination with others, provides an improved technique and mechanism for substantially balancing or minimizing the pressure differential upon the primary and secondary seals of a dual seal configuration, particularly by allowing pressure communication between the interior and exterior of the drill bit. The present invention includes devices that accommodate cone movement, thermal expansion of the fluid and/or out-gassing between the primary and secondary seals, and trapped air in the space between the seals. Many of the pressure communication devices of the present invention do not require substantial additional components, large space requirements in the bit, or highly complex manufacturing requirements for the bit. Also included are various pressure communication techniques and devices that will prevent the pressure differential across the dual seals from exceeding an upper limit, such as, for example, 100 psi. Yet a further feature of many aspects of the invention involves the use of an incompressible fluid having the capabilities of retaining sufficient viscosity to act as a medium for the transmission of energy between the primary and secondary seals, of retaining its lubrication properties, and/or of slowing the intrusion of abrasive particles to the primary seal—when and after the incompressible fluid is exposed to drilling fluid.

The characteristics and advantages of various aspects and embodiments of the present invention described herein, as well as additional features and benefits, will be readily apparent to those skilled in the art upon reading the following detailed description, referring to the accompanying drawings and reading the appended claims.

It should be understood that each claim herein does not necessarily require or encompass more than one feature or aspect of the present invention. Further, the disadvantages of the prior art and advantages, features and aspects of the present invention should not be considered limitations to any of the appended claims unless expressly recited therein, each claim being construed independently.

BRIEF DESCRIPTION OF THE DRAWINGS

For a detailed description of preferred embodiments of the invention, reference will now be made to the accompanying drawings wherein:

FIG. 10 is a partial cross-sectional view of a primarily radially energized annular seal.

FIG. 11 is a partial cross-sectional view of a primarily axially energized annular seal.

FIG. 12 is a partial cross-sectional view of a drill bit leg and cone of another embodiment employing a radially energized O-ring secondary seal.

FIG. 14 is an exploded partial cross-sectional view of a drill bit leg and cone of an embodiment employing a primary O-ring seal in an interstice and a secondary elongated O-ring seal disposed in a groove in the roller cone.

FIG. 15 is an exploded partial cross-sectional view of a drill bit leg and cone of an embodiment employing a secondary elongated O-ring seal disposed in a groove in the roller cone.

FIG. 16 is a partial cross-sectional view of a drill bit leg of another embodiment employing a primary O-ring seal disposed in an interstice and a secondary seal disposed in a groove in the leg journal segment.

FIG. 22a is a partial cross sectional view of the embodiment of FIG. 22 taken along line 22a—22a.

FIG. 25 is a partial cross-sectional view of an embodiment of the present invention employing a secondary seal disposed in a groove having a deep region.

FIG. 25a is a partial plan view of a secondary seal disposed in a groove having a deep region.

FIG. 25b is a partial cross sectional view of the embodiment of FIG. 25a taken along line 25b—25b.

FIG. 26a is a partial cross sectional view of the embodiment of FIG. 26 taken along line 26a—26a.

DETAILED DESCRIPTION OF PREFERRED EMBODIMENTS

Figure 1A:
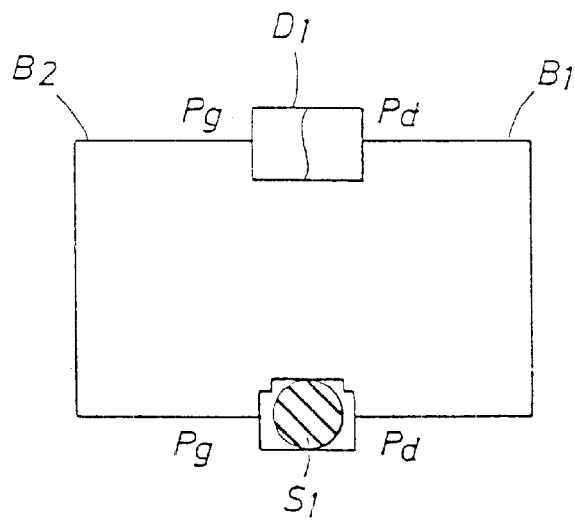
FIG. 1a is a schematic of a prior art single seal drill bit pressure compensation system.
Figure 1B:
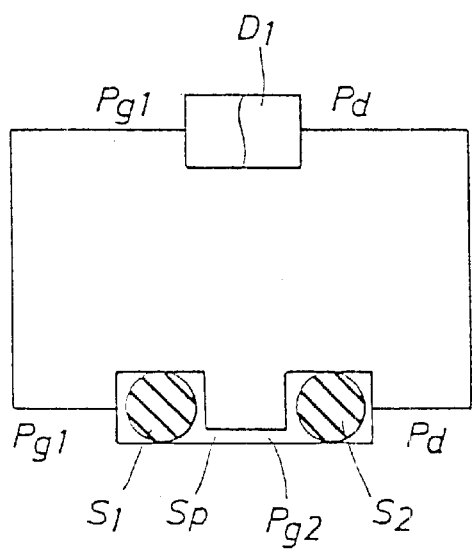
FIG. 1b is a schematic of a prior art dual-seal drill bit pressure compensation system.
Figure 1C:
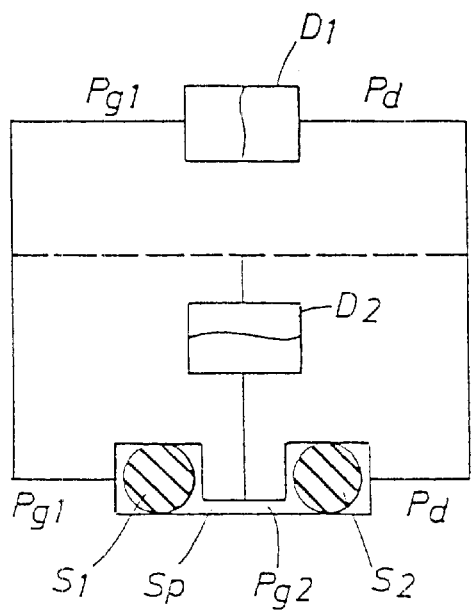
FIG. 1c is a schematic of another prior art dual-seal drill bit pressure compensation system.

Presently preferred embodiments of the invention are shown in the above-identified figures and described in detail below. In illustrating and describing the preferred embodiments, like or identical reference numerals are used to identify common or similar elements. The figures are not necessarily to scale and certain features and certain views of the figures may be shown exaggerated in scale or in schematic in the interest of clarity and conciseness.

Figure 2:
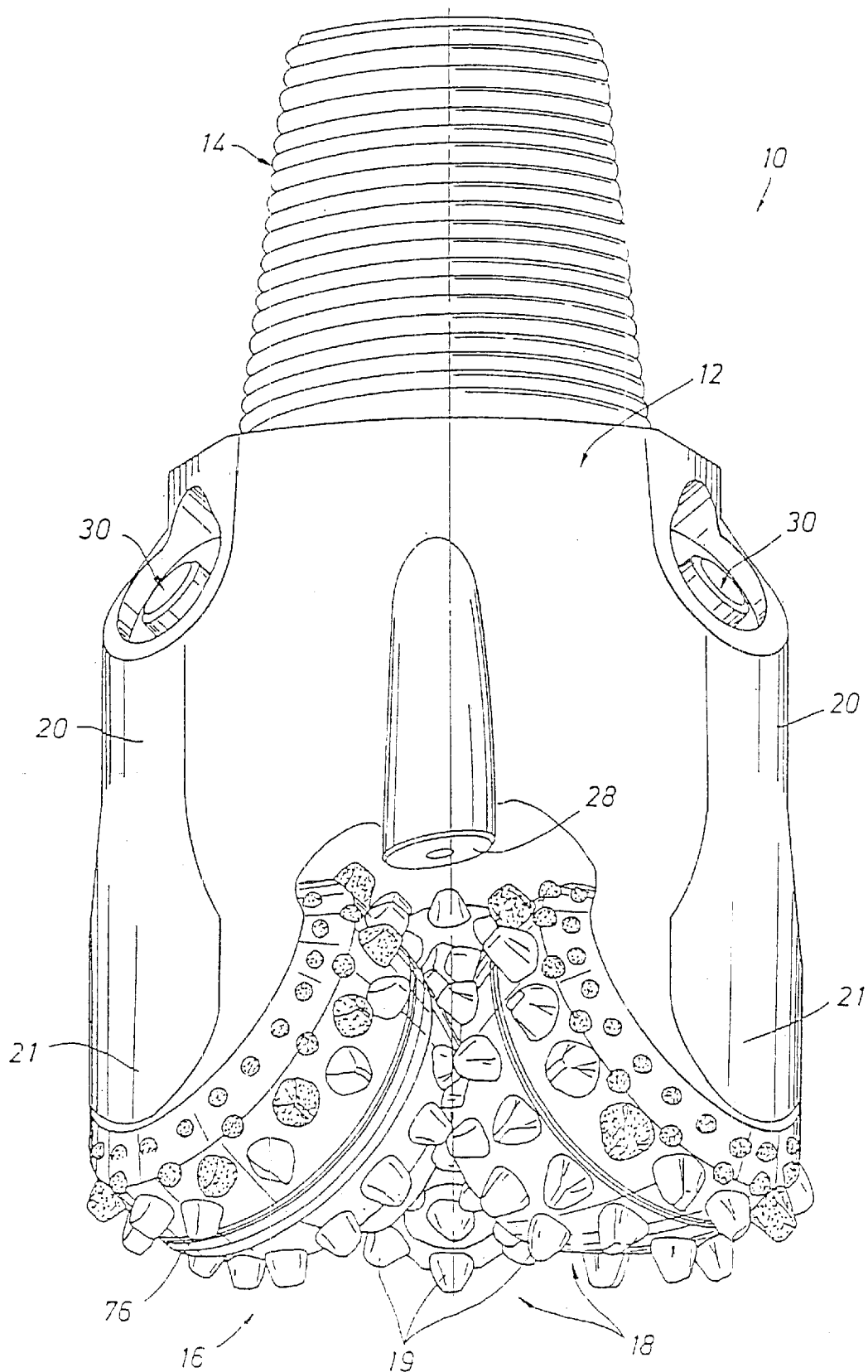
FIG. 2 is a perspective view of a dual-seal sealed bearing rotary cone drill bit.
Figure 3:
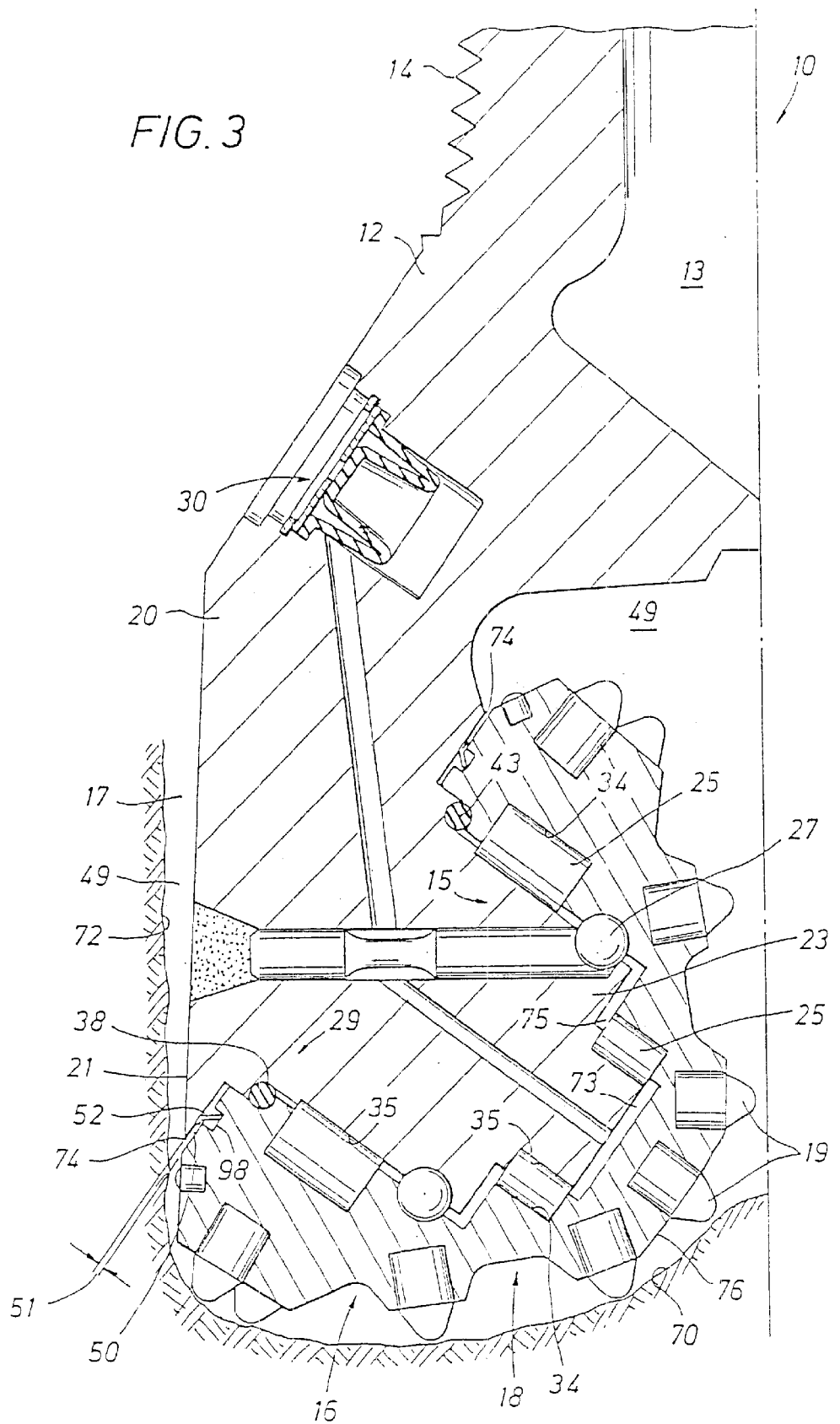
FIG. 3 is a cross-sectional view of one leg and cone of the rotary cone drill bit of FIG. 2.

Dual-seal drill bits are disclosed, for example, in U.S. patent application Ser. No. 08/982,081 entitled "Sealed Bearing Drill Bit with Dual-Seal Configuration," and Ser. No. 08/980,917 entitled "Composite Earth Boring Bit and Seal," both of which have a common assignee as the present application and are hereby incorporated herein by reference in their entireties. Referring initially to FIGS. 2 and 3, a sealed-bearing earth boring rotary cone rock bit 10 is shown in an earthen annulus, or borehole 17. It should be understood that the present invention is not limited to rotary cone rock bits 10 for petroleum well drilling, but may similarly be used in other types of sealed bearing earth boring drill bits. The bit 10 includes a bit body 12, a threaded pin end 14 and a cutting end 16. Legs 20 extend from bit body 12 toward the cutting end 16 of the bit 10. At the cutting end 16, each leg 20 carries a roller cone 18. Typically, rotary cone drill bits have three legs 20 and cones 18, although the present invention may be used in bits 10 with any number of leg 20/cone 18 combinations.

Figure 4:
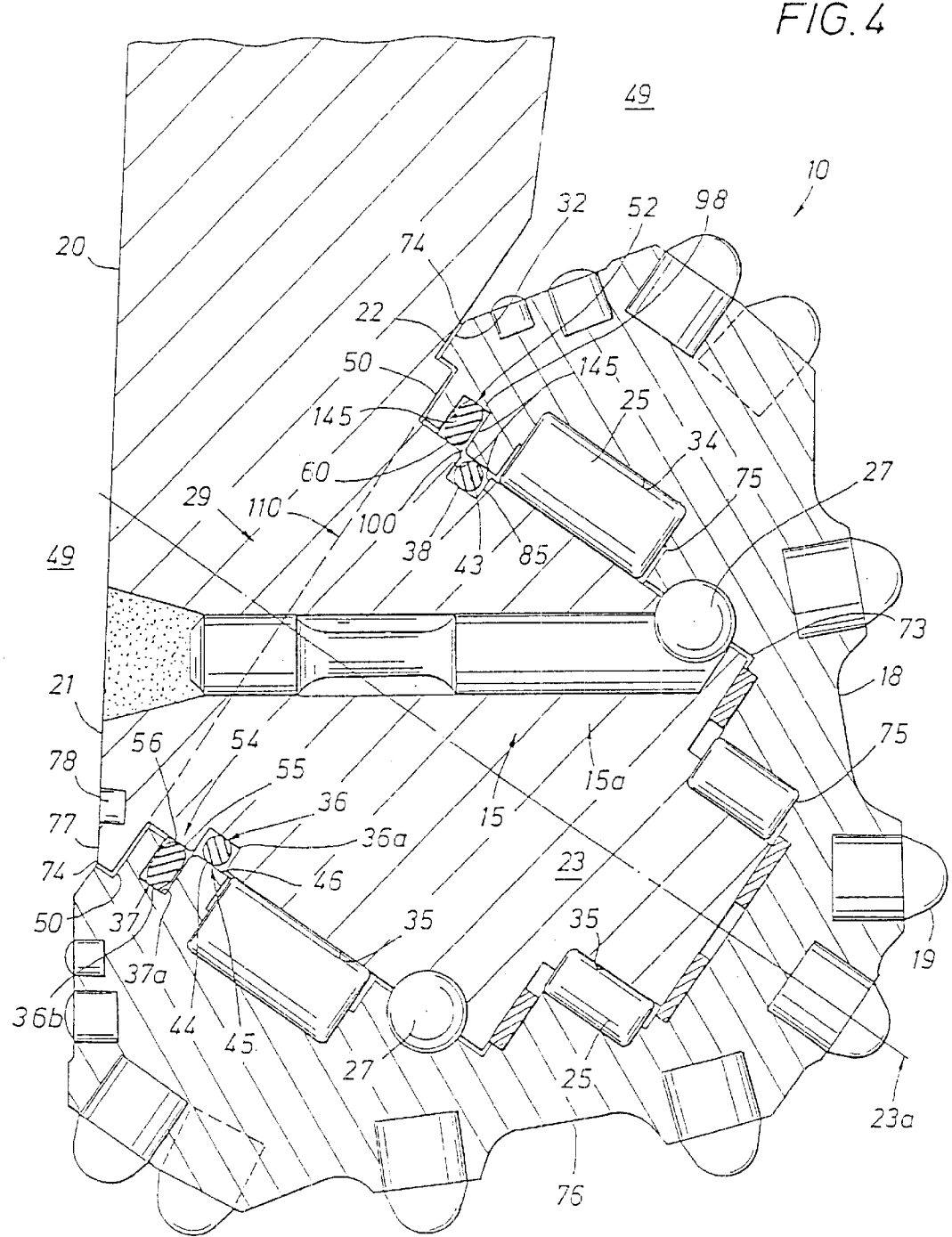
FIG. 4 is a is a partial cross-sectional view of one leg and cone of a rotary cone drill bit employing a primary seal disposed in an annular groove formed in a leg journal and a secondary seal disposed in an annular groove formed in the cone.

It should be understood that the following description is made, in part, with reference to a single leg 20, cone 18 and corresponding features, but applies equally to each leg 20 and cone 18 of the bit 10. Referring to FIGS. 3 and 4, the roller cone 18 is rotatably mounted upon a journal segment 23 of the leg 20, the journal segment 23 extending into the bore 73 of the cone 18. The journal segment 23 has a central axis 23a. The cone 18 is disposed on the leg 20 adjacent to a shirttail portion 21 of the leg 20. Adjacent cone and leg backface surfaces 32, 22 form a gap 50 that extends between the leg 20 and cone 18 to the exterior 49 of the bit 10. The gap 50 exits the bit 10 to the borehole 17 at an annular opening 74. Preferably, the bit is configured with the gap 50 having a generally uniform width 51, although a uniform width 51 is not necessary for operation of the invention.

Still referring to FIGS. 3 and 4, a conventional drill bit bearing system 15, such as the roller bearing system disclosed in U.S. Pat. No. 5,793,719 to Crockett et al., which is incorporated herein by reference in its entirety, permits the rotation of the cone 18 about the journal segment 23 during drilling operations. The conventional bearing system 15 includes various bearing elements. For example, the roller bearing system 15a of FIG. 4 includes cone bearing surfaces 34, journal bearing surfaces 35, roller bearings 25 and locking balls 27, disposed in one or more bearing cavities 75 formed between the cone 18 and journal 23, or in the bore 73 of the cone 18. A lubricant, such as grease (not shown), is provided to the bearing system 15 via a conventional lubricant reservoir system 30. A friction bearing system 15b (FIG. 5), operating as known in the art and having components, such as friction bearings 25a, similarly contained in the bearing cavities 75, may be used with the present invention. It should be understood that the present invention does not require a bearing system of any particular type.

Still referring to FIG. 3, a plenum 13 is shown formed in the bit body 12 in communication with the pin end 14 of the bit 10 allowing the supply of circulation fluid to one or more nozzles 28 (FIG. 2), as is known in the art. A circulation fluid, such as air, water, drilling mud or other fluids as is or become known in the art, is provided into the bit 10 from a fluid supply source (not shown) and through a supply conduit, such as a drill pipe (not shown), that is attached to the pin end 14 of the bit 10, as also known in the art. The nozzles 28 (FIG. 2) operate to direct pressurized fluid against the bottom 70 of the borehole 17 to lift earthen cuttings and other debris up through the borehole 17 to the surface (not shown). The nozzles 28 also direct the circulation fluid over the exterior 76 of the cones 18 and cutters 19 to free debris accumulating thereabout. However, the inclusion of a plenum 13, nozzles 28 are the supply of circulation fluid into the bit 10 is not required for the present invention.

The existence of earthen cuttings, mud and other debris in the borehole or annulus 17, along with "drilling fluid," which may be drilling mud, other liquids, gases or a combination thereof, and throughout the drilling environment makes it necessary that the bearing system 15 be isolated therefrom, or sealed. Introduction into the bearing system 15 of such contaminants leads to deterioration of the lubricant and bearing system elements in the bearing cavity 75, such as, for example, the roller bearings 25 and bearing surfaces 34, 35 (FIG. 4) which, in turn, leads to premature bit failure. A bearing system seal arrangement 29 is included to seal the bearing cavity 75 to protect its contents, such as bearing system 15, thus assisting in sustaining operability of the bit 10. A seal arrangement 29, as shown, for example, in FIG. 4, includes an annular primary seal 38 and an annular secondary seal 52.

Referring to FIG. 4, the seals 38, 52 must be able to function between a cone 18 and a leg 20 experiencing misalignment and relative movement during drilling operations due to flexing of the leg journal segment 23 and end-play, or cocking, of the cone 18 as a result of the uneven forces placed upon the cone exterior 76. Another consideration in configuring the seal arrangement 29 is the space within the bit 10 available for, or occupied by, the seal arrangement 29. The less space in the bit 10 that is occupied by the seal arrangement 29, the more space is available for other elements of the bit 10, such as the bearing system 15, particularly the bearings, and the greater the resulting capacity of the bearing system 15 and operability of the bit 10. Yet another concern is to minimize the time, effort and machinery for manufacturing and assembling the bit 10, such as for machining the leg 20, journal segment 23 and cone 18.

Still referring to FIG. 4, although the present invention is not limited to any particular configuration of dual-seal arrangement, the annular primary seal 38 is preferably disposed between the bearing cavities 75 and the opening 74 and between the cone 18 and journal segment 23, generally capable of providing an absolute seal around the bearing cavities 75. The term "absolute seal" as used herein means an intended fluid tight seal that allows no, or substantially no, fluid passage, by a seal having normal wear and tear and operating under typical pressure conditions, but which may yield to some degree of minimal leakage, such as when the seal is operating with a differential pressure present. An example of a seal that does not provide an absolute seal is a "hydrodynamic" seal, which allows fluid passage from the bearing cavity 75 to the gap 50. The annular secondary seal 52 is disposed between the primary seal 38 and the opening 74, and is generally capable of preventing substantial ingress of large debris and particles from the exterior 49 of the bit 10 and gap 50 to the primary seal 38. The secondary seal 52 may be placed between the cone 18 and either the leg 20 (FIG. 6) or leg journal segment 23 (FIG. 4).

Referring to FIG. 4, as used herein, the term "bit components" includes, but is not limited to, the leg 20 having a leg journal segment 23, and the cone 18. Because the cone 18 rotates relative to the leg 20 and leg journal segment 23 during drilling operations, each seal 38, 52 is capable of providing a seal between bit components that move relative to one another. Sealing by seals 38, 52 is effected by compression, or energization, of the seal between an opposed pair of surfaces ("energizing surfaces"), each energizing surface being on a different bit component. The remaining bit component surfaces surrounding the seal are primarily non-energizing surfaces, which are referred to herein as "non-energizing surfaces." While the non-energizing surfaces may be engageable with the seal 38 or 52, the seal is typically not compressed by such surfaces, and thus is not energized thereby.

Generally, each seal 38 and 52 is situated in the bit 10 such that it is capable of providing a static seal against an energizing surface of one component at a "static seal interface," the seal 38, 52 generally having little or no relative movement with that component. The static seal interfaces of seals 38, 52 are identified with the numerals 36 and 37, respectively. The surface of each seal 38, 52 forming the static seal interface is referred to as the "static sealing surface" or "primarily static sealing surface." A dynamic seal is generally formed at a "dynamic sliding seal interface" between the seal 38, 52 and the other energizing surface (of a different bit component) with which the seal 38, 52 primarily engages. The dynamic sliding seal interfaces of seals 38, 52 are identified with the numerals 45, 54, respectively. The surface of each seal 38, 52 forming the dynamic sliding seal interface is referred to as the "dynamic sealing surface" or "primarily dynamic sealing surface" 44, 55 of the seal 38, 52, respectively, and the energizing surface of the bit component forming the dynamic sliding seal interface is referred to as the "contact surface" 46, 56, respectively. Finally, each seal 38, 52 includes primarily non-energized surfaces, referred to herein as "non-energized" surfaces, that are engageable with the non-energizing surfaces of the bit components. For example, secondary seal surfaces 308 and 309 of FIG. 17 may be engageable with cone non-energizing surfaces 306, 307. Thus, the term "sealing surfaces" of a seal 38 or 52 as used herein encompasses all such seal surfaces.

Still referring to FIG. 4, while the present invention is not limited to any particular types of primary and secondary seals 38, 52, the primary seal 38 is typically an O-ring seal 43 having a dynamic sealing surface 44 constructed at least partially of an elastomeric material (not shown). An example of an O-ring seal useful with the present invention is described in U.S. Pat. No. 5,402,858 to Quantz et al., which is hereby incorporated herein by reference in its entirely. Other types of O-ring seals as are or become known in the art to be compatible for use as sealed bearing drill bit seals may be used. It should be noted that the term "O-ring" as generally used herein with respect to both the annular primary seal 38 and the annular secondary seal 52 is not limited to seals having only circular cross-sections, such as seal 43 of FIG. 4, but is intended to include seals having non-circular cross-sections, such as seal 43 of FIG. 5. Other types of annular sealing members (other than O-ring seals as defined above) that are, or become known to be, compatible for use as primary seal 38 may likewise be used. For example, the primary seal 38 may be a POLYPAK seal or spring-loaded POLYPAK seal manufactured by Seal Craft Corporation Corporation, Utah, a QUAD-RING seal manufactured by Quadion Corporation, Minnesota, a U-cup seal, a spring-loaded U-cup seal, or a lip seal. Furthermore, the seal 38 may be constructed of any suitable material or materials as is or becomes known in the art.

Figure 5:
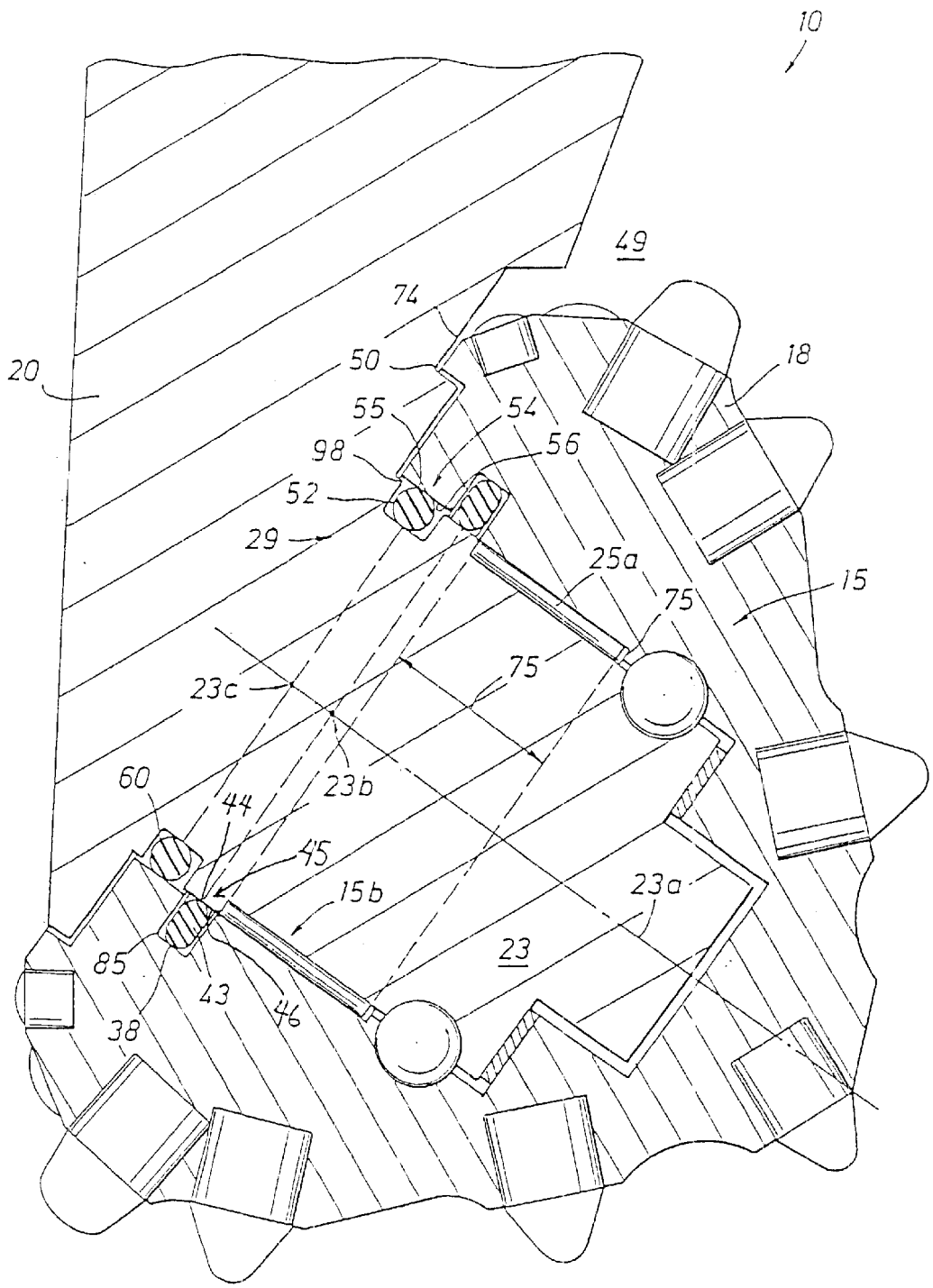
FIG. 5 is a partial cross-sectional view of one leg and cone of a rotary cone drill bit employing a primary elongated O-ring seal disposed in a groove in the roller cone and a radially energized secondary O-ring seal disposed in a groove in the leg journal segment.
Figure 6:
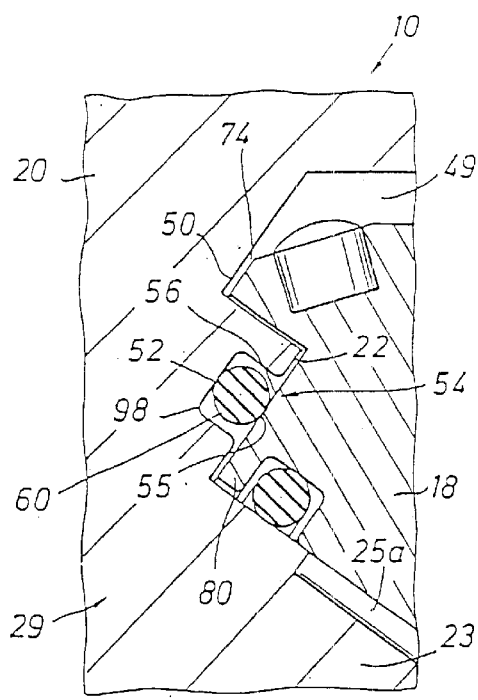
FIG. 6 is a partial cross-sectional view of one leg and cone of a rotary cone drill bit employing a primary O-ring seal disposed in a groove in the roller cone and a secondary O-ring seal disposed in a groove formed in the leg backface surface.

Referring to FIGS. 4 and 6, an annular outer, or secondary seal 52 is shown disposed in the bit 10 between the primary seal 38 and the opening 74. It should be noted that the term "secondary seal" as used generally herein includes single element seals, such as O-ring seals 60 (FIGS. 4, 5) or other types of annular sealing members that are, or become known to be, compatible for use as a secondary seal 52 in a dual-seal drill bit. Further, the seal 52 may be constructed of any suitable material or materials as is or becomes known in the art.

One or both of the seals 38, 52 may be disposed in grooves formed in bit components, or in interstices formed between bit components. A "groove," such as grooves 85, 98 of FIG. 4, includes a cutout portion in a single bit component. In a groove, at least a portion of each of a pair of opposed non-energizing surfaces are surfaces of a single component. When a seal is disposed in a groove, the seal is at least partially confined in non-energizing directions by primarily non-energizing surfaces of a single bit component. An "interstice," such as interstice 85*a* (FIG. 7) and interstice 98*a* (FIG. 8), is an annular area formed between bit components, wherein no portion of each of any pair of opposed non-energizing surfaces are surfaces of a single bit component. Further, each of a pair of opposed non-energizing surfaces of an interstice is at least partially on a different bit component.

The placement of one or both seals 38, 52, in interstices 85*a*, 98*a* generally occupies less space within the bit 10 as compared to the placement of one or both seals 38, 52 in grooves. Seal arrangements 29 with one or both seal 38, 52 in interstices can be very compact, allowing, for example, the placement of longer bearings, such as bearings 25*a* (FIG. 7), in the bearing cavities 75, increasing load capacity.

Further, the leg 20 and cone 18 of the bit 10 will generally be stronger than when grooves are formed therein, the formation of grooves requiring removal of mass of the bit component. For example, the use of interstices allows more optimal load capacity of the leg 20 than with the use of grooves, reduces the stress concentration factor in the leg 20 resulting from use of a groove formed in the leg 20 and reduces the possibility of breakage of the leg 20 at the groove, thus enhancing bit longevity. The use of interstices also saves time and effort in construction of the bit components, and reduces the complexity of the manufacturing process by eliminating the difficulty in machining grooves into the leg 20, leg journal 23 and cone 18.

Now referring to FIG. 4, the placement of one or both seals 38, 52 in grooves 85, 98, respectively, may provide benefits. For example, the opposing non-energizing surfaces 145 of groove 98 provide stability to the primarily elastomeric, elongated secondary O-ring seal 60. As pressure is applied to the seal 60 by the energizing surfaces 56, 37a of the groove 98, the seal 60 has a natural tendency to deform or bow therebetween. In addition, in a high differential pressure environment, such as a typical petroleum well, as will be described further below, the seals 38, 52 may be subject to being drawn, or extruded, into the annular chamber, or space 100, that is formed between the seals 38, 52. Such deformation and extrusion of a seal can reduce the sealing effectiveness of the seal and lead to seal failure. The opposing non-energizing surfaces 145 of the groove 98 will provide support for the sides of the seal 60, assisting in preventing such deformation. Furthermore, because opposing non-energizing surfaces 145 of groove 98 are both at least partially formed in the same bit component, and because a seal 52 in the groove generally does not move relative to the bit component within which the groove 98 is formed, the seal 52 thus being generally stationary relative to such opposing non-energizing surfaces 145, contact between the seal 52 and the non-energizing surfaces 145 that may occur during operations will not subject the seal 52 to substantial shear stress and wear that would occur if there was relative movement between the seal 52 and surface 145, which would damage the seal 52. The same benefits typically exist for the primary seal 38 in a groove 85.

The seals 38, 52 may be disposed in any among a variety of configurations of grooves and interstices as is desirable. For example, FIG. 5 shows the primary seal 38 may be disposed in an annular groove 85 formed in the cone 18. A dynamic sliding seal interface 45 is created between a dynamic sealing surface 44 of the primary seal 38 and a contact surface 46 of the journal segment 23 as the seal 38 generally rotates with the cone 18 relative to the leg 20. The primary seal 38 may instead be disposed in a groove 85 formed in the leg journal segment 23 (FIG. 4). In such configuration, a dynamic sliding seal interface 45 is formed between contact surface 46 of the cone 18 and dynamic sealing surface 44 of the seal 38 as the cone 18 generally rotates relative to the leg 20 during operations.

Figure 9:
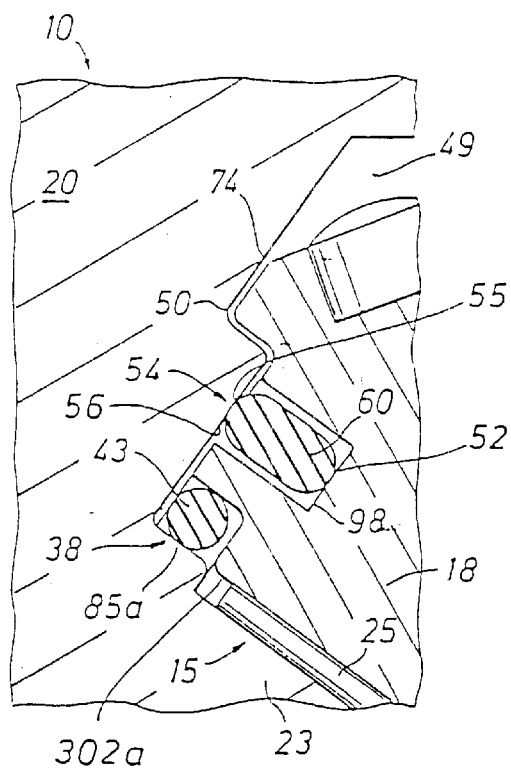
FIG. 9 is a partial cross-sectional view of another embodiment employing a primary O-ring seal disposed in an interstice and a secondary seal disposed in a groove in roller cone.

The secondary seal 52 may be disposed in a groove 98 formed in the cone 18 (FIGS. 4, 9), the seal 52 generally rotating with the cone 18 relative to the leg 20. A dynamic sliding seal interface 54 is created between the dynamic sealing surface 55 of the seal 52 and the contact surface 56 of the leg 20 (FIG. 9), or the contact surface 56 of the leg journal segment 23 (FIG. 4). In another configuration, the secondary seal 52 is disposed in a groove 98 in the journal segment 23, as shown in FIG. 5. In yet another configuration, the secondary seal 52 is disposed in a groove 98 in the leg backface 22 (FIG. 6). In each of these configurations, a dynamic sliding seal interface 54 is created between dynamic sealing surface 55 of the seal 52 and cone contact surface 56, the seal 52 being generally stationary relative to the leg 20 as the cone 18 moves relative thereto.

In various configurations, both seals 38, 52 are disposed in grooves. In FIG. 4, for example, the primary seal 38 is disposed in a groove 85 in the journal segment 23, while the secondary seal 52 is disposed in a groove 98 in the cone 18. In FIG. 5, the primary seal 38 is disposed in a groove 85 in the cone 18 and the secondary seal 52 is disposed in a groove 98 in the journal segment 23.

It should be understood, however, that the present invention is not limited any particular location, configuration or placement of the dual-seals in the bit.

As further background, the bit 10 may be configured such that the majority of the forces placed on the secondary seal 52 are either primarily axial, such as shown in FIGS. 3 and 6, or primarily radial, such as shown in FIGS. 4 and 5. As used herein, "axial" means generally parallel to, or in a plane not intersecting with, the central axis 23a of the journal segment 23 (FIG. 4), while "radial" means in a plane generally perpendicular to the central axis 23a of the journal segment 23.

For explanatory purposes, a secondary seal 52 having primarily radial forces acting on the seal 52 is shown in FIG. 10 disposed between components $C_1$ and $C_2$. Component $C_2$ has contact surface 56 that engages the dynamic sealing surface 55 of the seal 52, and moves relative to component $C_1$ similar to the relationship of cone 18 ($C_2$) and journal 23 ($C_1$) of FIG. 8. Opposing forces $F_1$ and $F_2$ from components $C_1$ and $C_2$ deflect the seal 52 across the width $W_1$ of the seal 52. As used herein, the term "deflection" means a change in the cross-section of a seal from its original shape in a particular direction (axial, radial, other) as the seal is being compressed between two components of a drill bit. "Elastomeric deflection" occurs when the spring force of the seal is caused by primarily elastomeric material of the seal. The forces placed upon the seal 52 are primarily radial because the opposing forces $F_1$ and $F_2$ are substantially perpendicular to the axis of rotation A of the moving component $C_2$. In FIG. 11, Component $C_2$ moves relative to component $C_1$ similar to the relationship of cone 18 ($C_2$) and leg 20 ($C_1$) of FIG. 6. The dynamic sealing surface 55 of the seal 52 engages contact surface 56 of component $C_2$. Opposing forces $F_1$ and $F_2$ from components $C_1$ and $C_2$ deflect the seal 52 across the width $W_2$ of the seal 52. Primarily axial forces are placed upon the seal 52 because the forces $F_1$ and $F_2$ are substantially parallel to the axis of rotation A of the moving component $C_2$.

The terms "radially energized" and "primarily radially energized" as used herein means that the major component, or majority, of the deflecting forces on a seal are in the radial direction, while "axially energized" and "primarily axially energized" means that that major component of the deflecting forces on a seal are in the axial direction. It should be understood, however, that the primary and secondary seals 38, 52 need not be primarily axially or radially energized, but may be generally energized axially and radially, or energized in another manner. Generally, a primarily radially energized seal 52, such as shown in FIGS. 4 and 5, experiences less variation in total deflection during operations and thus a more uniform contact pressure profile across the seal's dynamic sealing surface, as compared to an axially energized seal 52 (FIG. 6) because the cone 18 typically experiences less movement, cone cocking or misalignment relative to the leg 20 in the radial direction.

"Contact pressure" as used herein is the amount of pressure between a seal's dynamic or static sealing surface and the energizing surface of the bit component engaged by such seal surface resulting from placement of forces on the seal during its deflection. The contact pressure "profile" or "distribution" as used herein means the contact pressure on the seal at each location among numerous locations on the seal's (dynamic or static) sealing surface, while the "peak" contact pressure is the highest single value of contact pressure anywhere on the sealing surface. It is noteworthy that a more uniform contact pressure profile may result in more optimized and predictable seal operating conditions, reduced wear to the seal 52 and the contact surface 56, and decreased frictional heat produced thereby. Further, the dynamic sealing surface 55 of a radially energized seal 52 is generally capable of experiencing less lift-off caused by the misalignment, or relative movement, of the cone 18 and leg 20. The value of contact pressure, contact pressure profile or distribution and peak contact pressure may be measured when the drill bit in not in operation, such as upon assembly. During use, or bit operation, these variables are dynamic and their values will change.

For further background, primarily radially energized secondary seals 52 may be positioned between the cone 18 and leg 20, such as shown, for example, in FIG. 12, or between the cone 18 and leg journal segment 23 (FIGS. 4, 16). FIG. 4 depicts the use of an annular elongated O-ring 60 having a non-circular cross-section as a radially energized secondary seal 52. In FIG. 12, secondary seal 52 is an annular O-ring 60 having a circular cross-section that is primarily radially energized between surface 79 of the cone 18 and surface 86 of an annular lip 81 extending from the leg 20. The dynamic sliding seal interface 54 may be created between the outer surface 115 of the O-ring 60 and either, or both, of surfaces 79, 86. Primarily axially energized secondary seals 52 are shown, for example, in FIGS. 6 and 9. When the secondary seal 52 is primarily axially energized in bit 10, the seal 52 must generally be capable of withstanding a wide range of deflection due to the significant end-play of the cone 18 relative to the leg 20.

Figure 8:
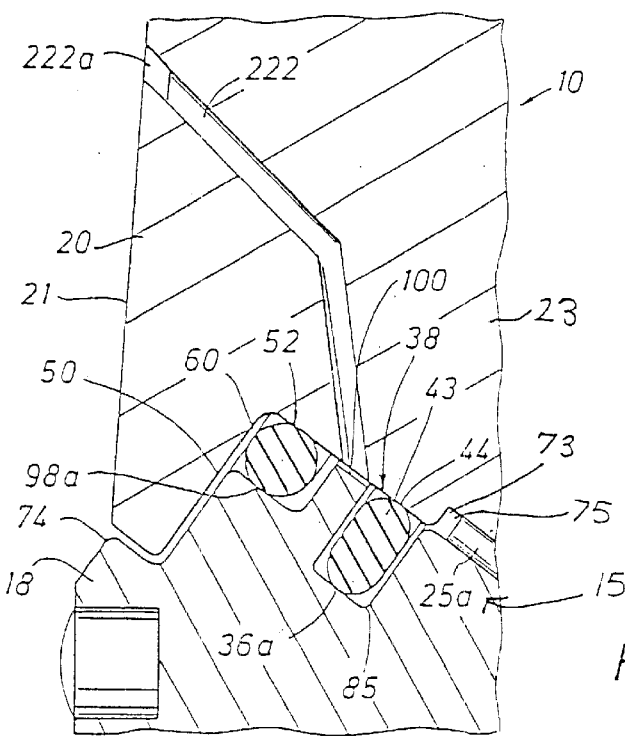
FIG. 8 is a partial cross-sectional view of one leg of a rotary cone drill bit of another embodiment employing a primary elongated O-ring seal disposed in a groove in the roller cone and a secondary O-ring seal disposed in an interstice, and having a passage extending from the annular space between the seals and the exterior of the bit.
Figure 13:
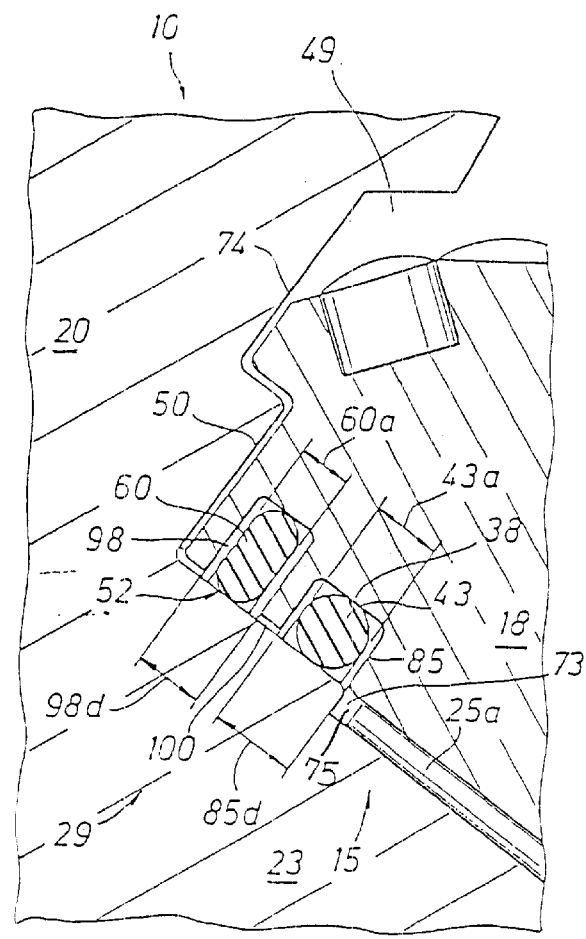
FIG. 13 is a partial cross-sectional view of a drill bit leg and cone of another embodiment employing a primary O-ring seal disposed in a groove in the roller cone and a secondary elongated O-ring seal disposed in a groove in the roller cone.

The present invention provides various apparatuses, techniques and methods for balancing or minimizing the pressure differential across the primary and secondary seals 38, 52. Referring to FIGS. 8 and 13, the annular chamber, or space, 100 is formed between the primary and secondary seals 38, 52 and between the cone 18 and leg 20. The space 100 may be in substantially absolute fluid isolation from the bearing cavity or cavities 75, bearing lubricant systems (not shown), cone bore 73 and bit bearing system 15. The term "substantially absolute fluid isolation" as used herein means a relationship where it is intended that there be no fluid communication, but which may yield some degree of leakage, such as leakage of fluid past the primary seal during normal operations. Further, an incompressible fluid (not shown), such as grease, may be disposed within space 100, serving as a hydrostatic pressure transmission media and also as a seal lubricant. For example, during drilling in a primarily liquid circulation fluid drilling environment where a significant hydrostatic head or borehole pressure is anticipated, such as petroleum borehole drilling, the incompressible fluid in space 100 transmits pressure between the bore 73 of the cone 18 or bearing cavity 75, and the exterior 49 of the bit 10 as the internal and external pressures vary during operations. In such instance, if the space 100 is not filled with incompressible fluid, such as grease, the pressure differential could cause the seals 38, 52 to be drawn to and possibly extruded into the lower pressure space 100. As used herein, the terms "hydrostatic head" and "borehole pressure" mean pressure created by a column of fluid at a specific depth, such as the depth of the drill bit.

Incompressible fluid may be placed into the annular space 100 by any suitable methods, which may vary depending on the configuration of the present invention. For example, space 100 may be vacuum filled with incompressible fluid through one or more channels 222 (FIG. 8) accessible from the surface 21 of the leg 20 at least during assembly of the bit 10, such as after the seals 38, 52 are placed into the bit 10 and the leg 20 and cone 18 are connected. Once the space 100 is sufficiently filled with incompressible fluid, the channel 222 may be filled, or plugged with any suitable type of plug, such as with a threaded plug, welded plug, or a metal plug, 222a, secured in channel 222 by weld, interference fit, or other conventional techniques. It should be understood that the channel and plug if used, can take any other form or configuration that is suitable for use with the present invention.

One aspect of the present invention is a preferred incompressible fluid for use between the primary and secondary seals 38, 52. It should be understood, however, that the pressure communication apparatuses, techniques and methods of the present invention do not require the inclusion of the preferred incompressible fluid. The preferred incompressible fluid, such as a grease, has the capabilities of retaining sufficient viscosity to act as a medium for the transmission of energy between the primary and secondary seals and of retaining its lubrication properties when exposed to drilling fluid. For example, with the inclusion of such a preferred incompressible fluid in space 100 of the bit configuration of FIG. 4, the intrusion of drilling fluids into the space 100 from the gap 50 will not cause the incompressible fluid in space 100 to substantially chemically decompose. In effect, the use of an incompressible fluid in accordance with the present invention will assist in ensuring the presence of lubricant on the outer side of the primary seal 38 and its dynamic sealing surface 45, which can assist in preserving and extending the life of the primary seal 38, and thus preserve the contents of the bearing cavity 75 and the drill bit 10.

In another aspect, the preferred incompressible fluid can be designed to possess the capability of slowing the intrusion of abrasive particles through the space 100 to the primary seal 38. For example, the incompressible fluid, such as a thick, tacky grease, may be designed to be capable of trapping debris particles in the space 100, or causing such particles to become suspended and slowing the formation of conglomerates of such particles. Such grease will act as a barrier to prevent or delay the ingress of such particles to the primary seal 38, thus assisting in preserving the primary seal 38.

Any suitable composition of incompressible fluid having one or more of the above capabilities may be used. For example, the incompressible fluid could be a composition of all synthetic components or a blend of synthetic and mineral components. For another example, the incompressible fluid may include few, or no, extreme pressure additives or metal-to-metal friction reducers, and/or may include a higher percent by weight of tackifiers as compared to conventional sealed bearing drill bit bearing lubricants, such as disclosed in U.S. Pat. No. 5,589,443 issued on Dec. 31, 1996, having a common assignee as the present application and hereby incorporated by reference in its entirety. For example, the incompressible fluid is preferably a grease possessing a water washout valve less about than approximately 50%, and more preferably less than about 30%, per ASTM D-4049 water spray test for lubrication characteristics. The grease may also preferably include polymer tackifer of between approximately 1% and 5% by weight. The grease may also preferably be a mineral synthetic blend in which minerals constitute approximately 10–30 percent of the base oil, the balance of approximately 70–90 percent of the base oil being synthetic.

A particular composition of the preferred incompressible fluid includes the following:

| MATERIAL | PREFERRED WEIGHT RANGE | PREFERRED WEIGHT |
| --- | --- | --- |
| mineral oil | 10–30% | 20.00% |
| high viscosity synthetic oil | 50–70 | 66.40 |
| low viscosity synthetic oil | 1–10 | 6.00 |
| silicla thickener | 1–10 | 5.50 |
| poly-iso-butylene tackifier | 1–5 | 2.00 |

In accordance with the present invention, there is provided various techniques and apparatuses for balancing or minimizing the pressure differential across the primary and secondary seals 38, 52 of a dual-seal sealed bearing drill bit. The pressure communication apparatuses, techniques and methods of the present invention generally involve the migration of fluid from the annular space 100 to the bit exterior 49, and may also include the migration of fluid from the borehole 17 into the space 100. The objective is to communicate fluid pressure between the space 100 and borehole 17 so that the chamber pressure within the space 100 (FIG. 17) may be maintained equal to or within a reasonable range of the borehole pressure.

All of the various structures described below and variations thereof can be used for at least permitting the flow of fluid from the annular space 100 to the borehole 17, or "one way fluid migration," and, as will become apparent, can be used or modified to be used for permitting fluid flow in both directions between the space 100 and borehole 17 as "two-way fluid migration" or "biased two-way fluid migration." "Biased two-way fluid migration" allows migration in one direction, such as from the space 100 to the borehole 17, at lesser differential pressure ranges than migration in the other direction. Furthermore, these structures include structures integral to the seal 52 and/or structure integral to one or more bit components, or a combination thereof.

Figure 7:
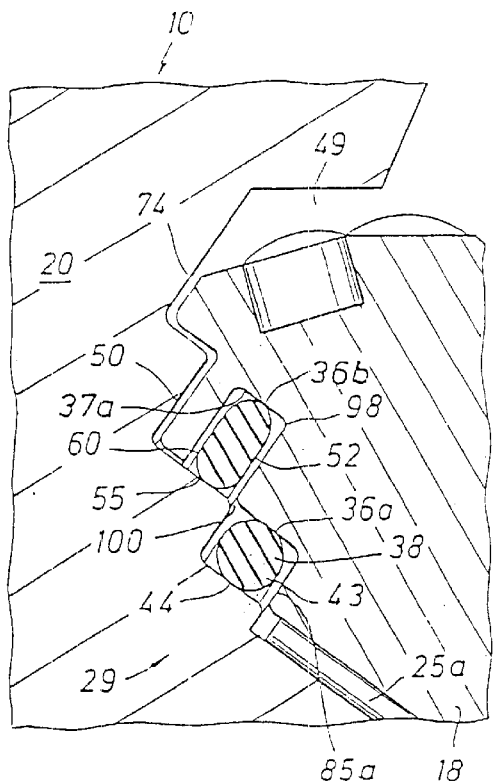
FIG. 7 is a partial cross-sectional view of one leg and cone of a rotary cone drill bit of another embodiment employing a primary seal disposed in an interstice and a secondary seal disposed in a groove in the roller cone.

In one configuration of the present invention, now referring to FIG. 7, the seal arrangement 29 may be configured so that the seals 38, 52, particularly their respective dynamic sealing surfaces, have different contact pressures, contact pressure profiles and/or peak contact pressures. Using the peak contact pressure as a reference, generally, the lower the peak contact pressure on a seal, the more limited the sealing capability of the seal and the less the seal will wear. The higher the peak contact pressure, the more sealing the seal will provide and the more the seal will wear and generate heat. Because it is typically desirable that the primary seal 38 generally provide an absolute seal around the bearing cavity 75, the bit 10 is designed such that the peak contact pressure on the primary seal 38 is great enough to overcome and resist pressure generated in space 100, referred to herein as the "chamber pressure" of space 100. If the peak contact pressure of the primary seal 38 is too low, fluid could pass by the seal 38 from the space 100 into the bearing cavity 75, contaminating its contents, such as the bearing system 15.

In accordance with this aspect of the present invention, in some operations, such as drilling in an environment having a significant hydrostatic head, it may be desirable to include a secondary seal 52 with a contact pressure, contact pressure profile an/or peak contact pressure that is lower than that of the primary seal 38. One reason may be to allow fluid migration past the secondary seal 52 for pressure communication between the space 100 and bit exterior 49, as will be described further below. Another reason is to reduce wear on the secondary seal 52.

The contact pressure, contact pressure profile and peak contact pressures of the seals 38, 52 can be affected by controlling or selecting the material composition of the seals 52, 38, which will vary the resistance of the seal to compression between bit components. Differing material compositions are disclosed, for example, in U.S. patent application Ser. No. 08/727,001 filed on Oct. 8, 1996, entitled "Composite Rock Bit Seal," U.S. patent application Ser. No. 08/980,917 entitled "Composite Earth Boring Bit Seal" filed on Dec. 1, 1997, and U.S. Reissue application Ser. No. 08/649,954 entitled "Composite Seal for Rotary Cone Rock Bits" and filed on Jul. 8, 1996, all of which have a common assignee with the present application and are hereby incorporated by reference in their entireties.

Another way to vary or control the contact pressure of seals 38, 52 is by shaping the seals 38, 52. Generally, the greater the height of the seal as measured between it's static and dynamic sealing surfaces, the lower the seal's peak contact pressure assuming the same deflection. Referring to FIG. 14, for example, seals 60, 43 could be formed with widths 60a, 43a of 0.250" and seal 60 formed with a height 60c of 0.500." Seal 43, having a circular cross-section, would have a height 43b of 0.250". All other variables, such as material composition and seal deflection, being the same for both seals 43, 60, the elongated O-ring seal 60 would have peak contact pressures at its dynamic and static sealing surfaces (not shown) lower than those of the seal 43, as long as seal 60 is not restricted in deflection by the sidewalls 145 of groove 98.

Referring again to FIG. 7, the contact pressure on seals 38, 52 could also be controlled or varied by shaping the dynamic sealing surfaces 44, 55 of the seals 38, 52, respectively. All other variable being constant, the larger the area of the dynamic sealing surface of a seal, the lower the contact pressure. The same is true for the static sealing surfaces 36a, 36b of the seals 38, 52, respectively. For example, as shown in FIG. 15, the static sealing surface 36b of seal 60 may be smaller than its dynamic sealing surface 55, causing the peak contact pressure of the seal 52 to be greater at the static sealing surface 36b than at the dynamic sealing surface 55.

The use of seals having a non-circular cross sections, such as elongated O-ring seal 60 shown in FIG. 13 and elongated O-ring seal 43 of FIG. 8, provides other benefits that may be desirable in various configurations. Generally, all other variables being equal for two seals having the same deflection, a seal having a non-circular cross-section may require a groove or interstice that is narrower than the groove or interstice necessary to carry a seal having a circular cross-section, allowing more space in the bit for other components, such as bearings 25a, and allowing greater bearing capacity. Referring to FIG. 13, for example, if a deflection of 0.050" is desired for each seal 60, 43 where a 10% squeeze is expected, an O-ring seal 43 having a width of 0.500" would be necessary, requiring a groove 85 of sufficient width 85d to accommodate the seal 43. Because the elongated O-ring seal 60 requires only a width 60a of 0.250" to provide a deflection of 0.050" if the seal 60 has a height 60c (FIG. 14) of 0.500," the width 98d of the groove 98 would be smaller than the width 85d of the groove 85.

In another aspect of the invention, the contact pressure can be varied between the primarily dynamic sealing surface 55 and the primarily static sealing surface 36b (FIG. 4) of the secondary seal 52 to allow fluid migration past the seal 52. Similar techniques can be used to vary the contact pressure of the static and dynamic sealing surfaces of seal 52 as described above with respect to differing the contact pressure between the dynamic sealing surfaces of the primary and secondary seals 38, 52. Further, various of the techniques described below can be used in this type of configuration.

In still another aspect of the present invention, the contact pressure can be varied between circumferentially adjacent regions of one of the sealing surfaces of the secondary seal 52 using the techniques described above and below. This can be done with the static sealing surface 36b (FIG. 4), dynamic sealing surface 55, and/or possibly even one or more non-energizing surfaces of the seal, or a combination thereof. As used herein, the term "circumferentially adjacent" means next to one another on either the outer or the inner circumference of an annular shaped member or area, such as a seal, seal surface, bit component surface, groove and interstice. For example, the dynamic sealing surface at a particular cross-section of an O-ring seal is not circumferentially adjacent to the static sealing surface at that cross-section of the seal, but is circumferentially adjacent to the dynamic sealing surface at an adjacent cross-section of the seal.

Figure 17:
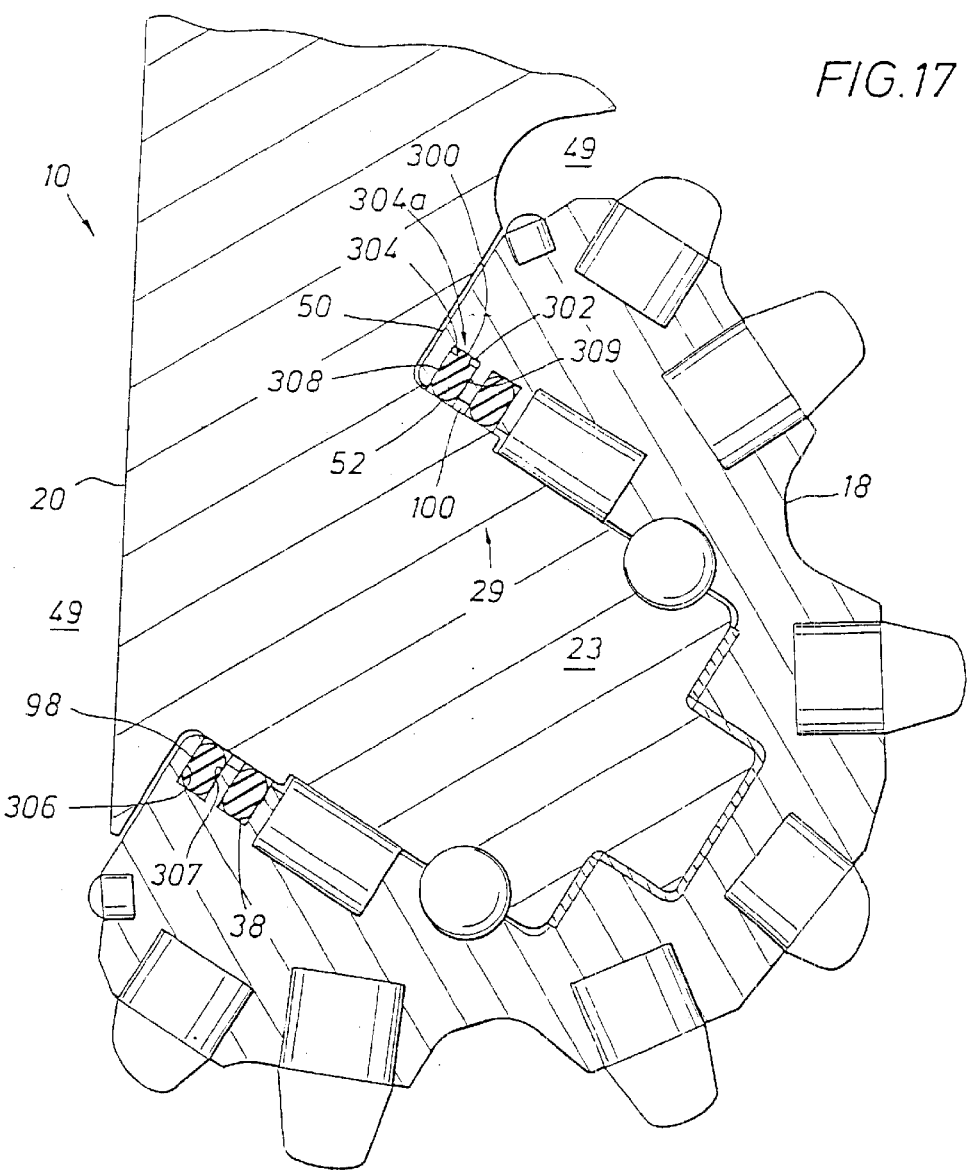
FIG. 17 is a partial cross-sectional view of a drill bit leg and cone of an embodiment of the present invention employing a secondary seal having a thin region and capable of allowing two-way migration of fluid past the secondary seal.
Figure 17A:
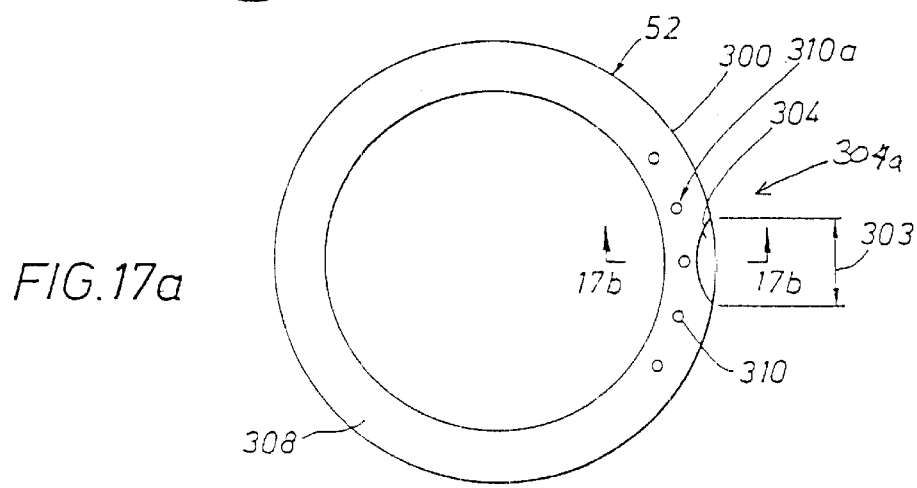
FIG. 17a is a top plan view of the secondary seal of FIG. 17.
Figure 17B:
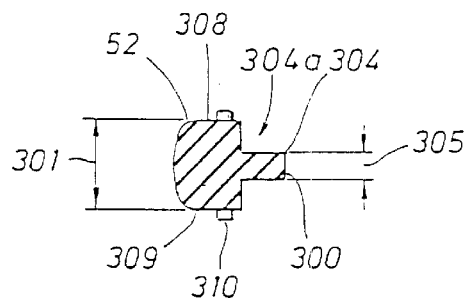
FIG. 17b is a cross-sectional view of the secondary seal of FIG. 17a taken along line 17b—17b.

In another aspect of the invention, fluid migration, particularly two-way fluid migration, past the secondary seal 52 may be accomplished by varying the thickness of the secondary seal 52, such as shown for example in FIG. 17. In FIG. 17, an elongated O-ring secondary seal 52 is disposed in groove 98 between the cone 18 and leg journal segment 23. A primarily static seal is formed between the static sealing surface 300 of the seal 52 and the energizing cone surface 302. The seal 52 has at least one region having a thin portion 304a with a thickness that is smaller than the thickness of the remainder of the seal 52. Referring to FIGS. 17a and 17b, at least one thin portion 304a, such as lip 304, is formed in the seal 52 along the outer surface 300. The surface 300 at the lip 304 is thus thinner than the surface 300 across the adjacent circumferential regions, or remaining circumference, of the seal 52.

Figure 17C:
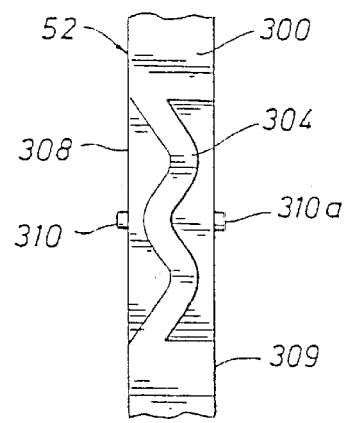
FIG. 17c is an exploded partial cross-sectional view of another embodiment of the secondary seal having a decreased thickness, bellows shaped, region capable of allowing two-way fluid migration.

The thin portion 304a may take any suitable shape, configuration, orientation and length 303. In FIG. 17b, for example, the thin portion 304a is a lip 304 that is horizontally oriented relative to the outer surface 300 of the seal 52 and possesses a thickness 305 that is less than the thickness 301 of the seal 52. In FIG. 17c, a lip 304 is shown in the shape of a bellows. Another example is a thin portion that is vertically oriented (not shown) relative to the outer surface 300 of the seal 52. It should be understood that other surfaces of the secondary seal 52, such as the dynamic sealing surface or non-energized surfaces, or a combination thereof may have the one or more regions having thin portions 304a in accordance with this aspect of the invention.

Referring again to FIG. 17, when the pressure in the space 100 exceeds the borehole pressure, the lip 304 will tend to deform in the direction of the gap 50, allowing the migration or flow of fluid, particularly lubricant (not shown), from the space 100, past the seal 52, through the gap 50 and to the bit exterior 49. If the pressure in the space 100 is instead lower than the borehole pressure, the lip 304 will tend to move in the direction of the space 100, allowing drilling fluid (not shown) to migrate from the gap 50 into the space 100.

The seal 52 can, if desired, be designed to vary the pressure tolerance of the thin portion(s) 304a to allow fluid migration at a particular differential pressure value or range (between the chamber pressure of the space 100 and the borehole pressure). This can be done, for example, by selecting a particular length 303, thickness 305 and/or material properties of the region(s) of the seal 52 having the thin portion 304a, or of the seal 52 itself. For example, increasing the length 303 of the thin portion will lower the stiffness of the thin portion, lowering its pressure tolerance. The seal 52 may thus be designed to allow fluid migration by the secondary seal 52 when the differential pressure is, for example, at a certain value or within a certain range, such as between about 0.0 psi to about 100.0 psi, and preferably between about 30 psi and about 70 psi.

Now referring to FIGS. 17a–c, a flow enhancement mechanism 310a involving a different sealing surface or surfaces of the seal 52 (other than the seal surface located on the thin portion 304a) can be included to assist in the migration of fluid past the secondary seal 52. The flow enhancement mechanism 310a can be integral to the seal 52, and/or to one or more bit component surfaces adjacent the seal 52. For example, referring to FIGS. 17a–c, the flow enhancement mechanism can be a seal surface feature, such as protrusions 310 on the side (non-energized) surfaces 308, 309 proximate to the thin portion 304a of the seal 52. The protrusions 310 create fluid flow passageways between the side surfaces 308, 309 of the seal 52 and the adjacent non-energizing cone surfaces 306, 307 (FIG. 17) with which they are engageable, respectively. Other examples of seal surface features that can be used to serve as flow enhancement mechanisms 310a include ridges, waves, corrogations (not shown) and any other suitable surface feature known in the art to be capable of creating fluid flow passageways between the seal 52 and adjacent bit component surfaces without substantially surrendering the integrity of the seal 52. Similarly, the flow enhancement mechanism(s) 310a can be formed on a region of one or more bit component surface other than the surface engageable with the thin portion 304a of the seal 52, such as in the form of slits, grooves, depressions, waves, pits, cut-outs, pockets (not shown) and any other suitable surface feature known in the art to create fluid flow passageways between the component surface and the seal 52 without substantially surrendering the integrity of the seal 52 or bit component. In effect, the flow enhancement mechanism 310a, whether integral to the seal or bit component(s), or both, can be any alteration to the subject surface of the seal or bit component in one or more regions of the seal or bit component that render such surface uneven as compared to circumferencially adjacent regions of the item (seal or bit component).

Figure 18:
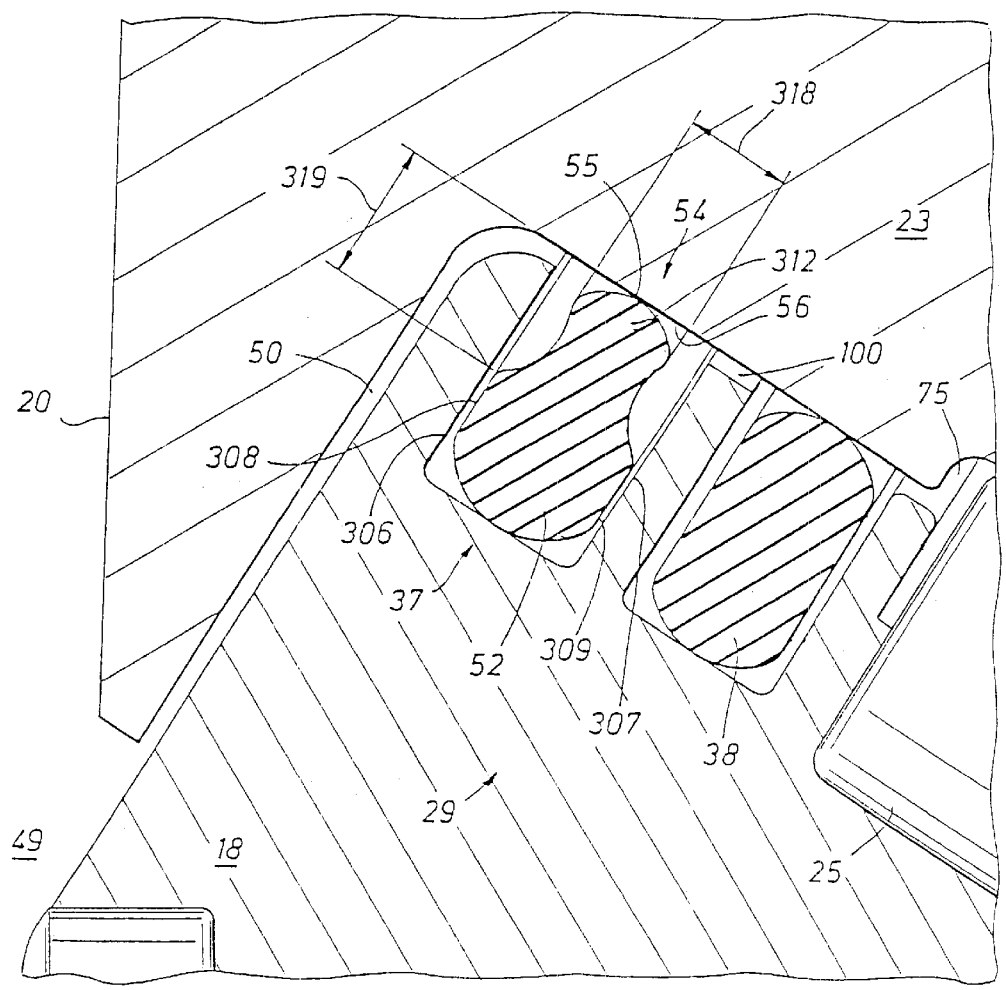
FIG. 18 is a partial cross-sectional view of another embodiment of the present invention employing a secondary seal having a tapered region formed along the dynamic sealing surface of the secondary seal.
Figure 19:
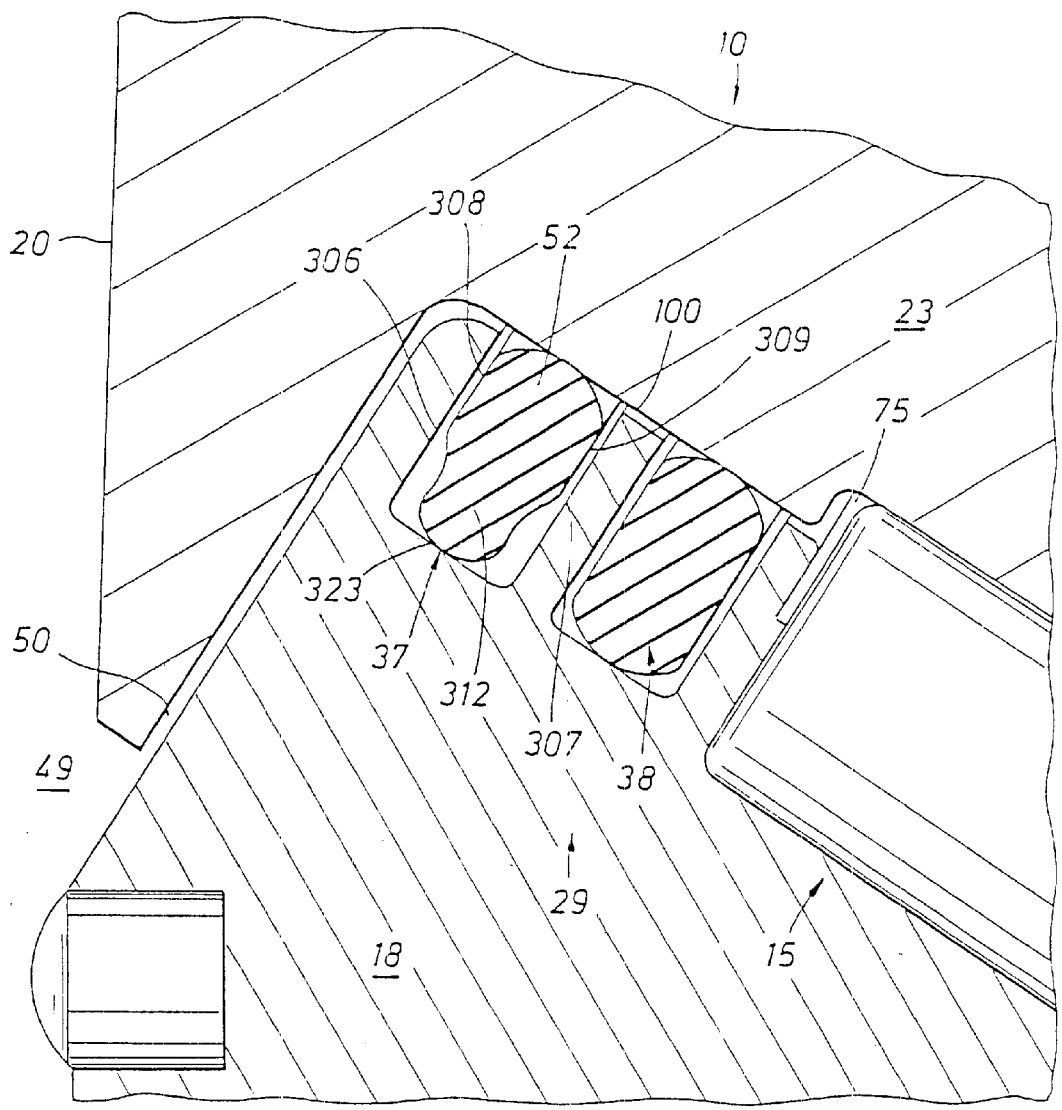
FIG. 19 is a partial cross-sectional view of another embodiment of the present invention employing a secondary seal having a tapered region formed along the static sealing surface of the secondary seal.

In another aspect of the invention, fluid migration, particularly two-way fluid migration, past the secondary seal 52 may be accomplished by the use of a secondary seal 52 with one or more regions 312 that have a tapered cross-section, such as shown, for example, in FIGS. 18 and 19. In FIG. 18 tapered region 312 is formed only on the side of the seal 52 having the dynamic sealing surface 55; thus, part of the dynamic sealing surface 55 is on the outer surface of the tapered region 312. The tapered region 312 may instead be located only on the side of the seal 52 having the static sealing surface 323 (FIG. 19). Yet another configuration includes a tapered region 312 formed around the inner and outer circumference (not shown) of the seal 52, thus providing tapered regions 312 on both the static and dynamic sealing surfaces. Further, the tapered region 312 can have any shape as long as it provides the corresponding static or dynamic sealing surface, or both, with a smaller cross-section than circumferentially adjacent regions, or the remaining regions, of such surfaces, or as long as it allows fluid migration at a particular differential pressure valve or range, such as when the inner or outer circumference of the entire seal 52, or both, is tapered.

Still referring to FIGS. 18 and 19, as the differential pressure between the chamber pressure of the space 100 and the borehole pressure varies, or reaches a predetermined level or range, the tapered region 312 will deform away from the higher pressure side, lowering the contact pressure at the tapered region 312 and allowing fluid migration from the higher pressure side generally similarly as described above with respect to FIGS. 17–17c. Also similarly as described above with respect to FIGS. 17–17c, the seal 52 and tapered portion 312 can be designed to allow for fluid migration at specified differential pressures values or ranges, such as by varying the thickness 318, height 319, length (not shown) or material properties of the tapered region 312, or of the seal 52, or a combination thereof. Yet further similarly as described above with respect to FIGS. 17–17c, flow enhancement mechanisms 310a may be included.

Figure 20D:
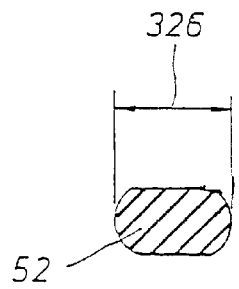
FIG. 20d is a cross-sectional view of the seal of FIG. 20a taken along line 20d—20d.
Figure 20C:
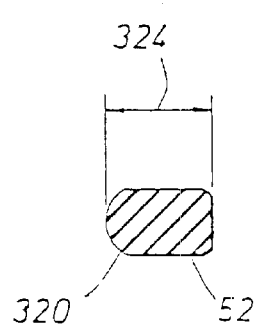
FIG. 20c is a cross-sectional view of the seal of FIG. 20a taken along line 20c—20c.
Figure 20:
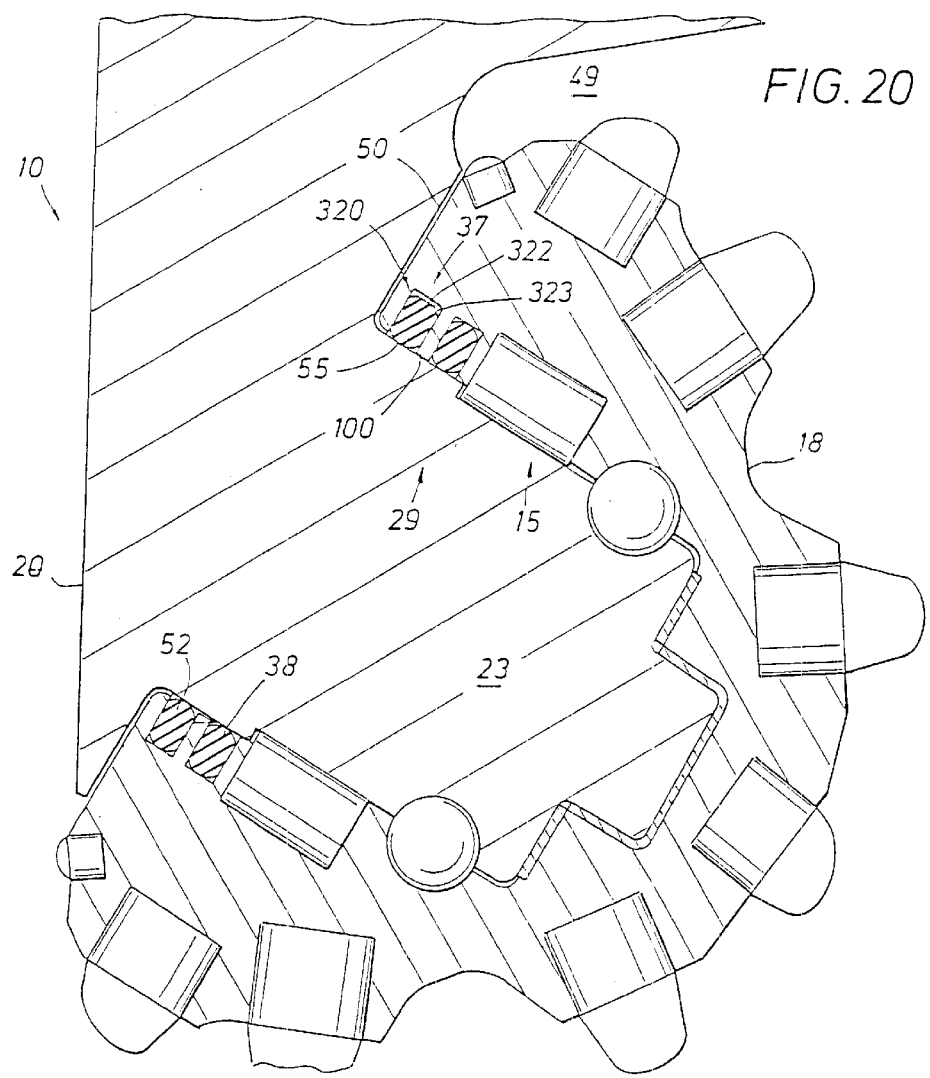
FIG. 20 is a partial cross-sectional view of another embodiment of the present invention employing a secondary seal having a decreased height region.

In yet another aspect of the invention, referring to FIGS. 20–20d, fluid migration, particularly two-way fluid migration, past the secondary seal 52 may be accomplished by the use of a secondary seal 52 with one or more decreased height regions 320 upon which one of the sealing surfaces of the seal 52 extends. For example, seal 52 of FIGS. 20 and 20a has decreased height region 320 formed across length 321 of the outer circumference of the seal 52. The static sealing surface 323 of seal 52 is thus on the surface 322 of the decreased height region 320. As shown in FIGS. 20c–d, region 320 has a height 324 which is smaller than the height 326 of the reminder of the seal 52 (the circumferencially adjacent regions of the seal 52), and will thus have a lower contact pressure at static seal interface 37 (FIG. 20).

Figures 20A, 20B:
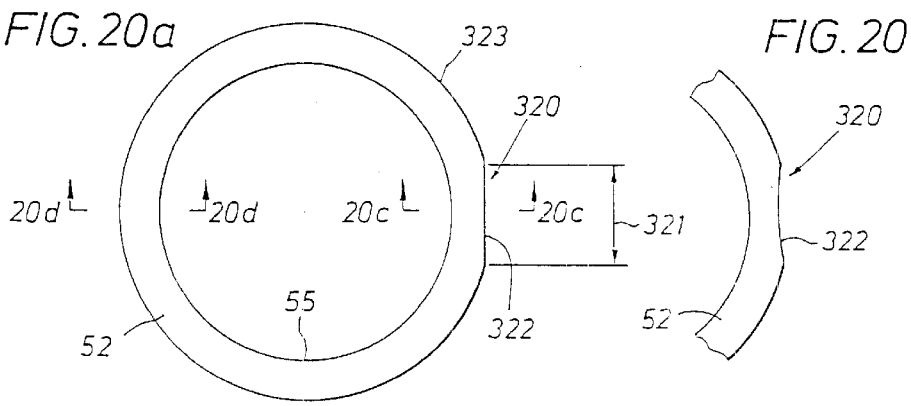
FIG. 20a is a top plan view of the secondary seal of FIG. 20.
FIG. 20b is a partial top plan view of another embodiment of the secondary seal having a decreased height region.

The decreased height region 320 of the seal 52 can be formed on the side of the seal 52 having the static or dynamic seal surface, or both, and can have any suitable size and configuration, as desired, so long as the sealing surface on the region 320 has a contact pressure range lower than the remainder of the seal surface or allows fluid migration at a particular differential pressure valve or range, and the integrity of the seal 52 is not substantially diminished. For example, the region 320 can be on the inner circumference of the seal 52 and the region 320 can carry the seal's dynamic sealing surface. For another example, the surface 322 of region 320 can be formed in a concave shape, as shown in FIG. 20b. In use, when the differential pressure between the chamber pressure of the space 100 (FIG. 20) and the borehole pressure reaches a certain level or range, the contact pressure of the region 320 will be insufficient to retain the fluid pressure and will allow fluid migration from the side with the higher pressure into or out of the space 100. Again, as described above for FIGS. 17–17c, the seal 52 having a decreased height region 320 can be designed to allow for fluid migration at specified differential pressures values or ranges, such as by varying the height 324, length 321 or material properties of the region 320 or seal 52, or a combination thereof. Yet further similarly as described above with respect to FIGS. 17–17c, flow enhancement mechanisms 310a may be included.

Figure 21:
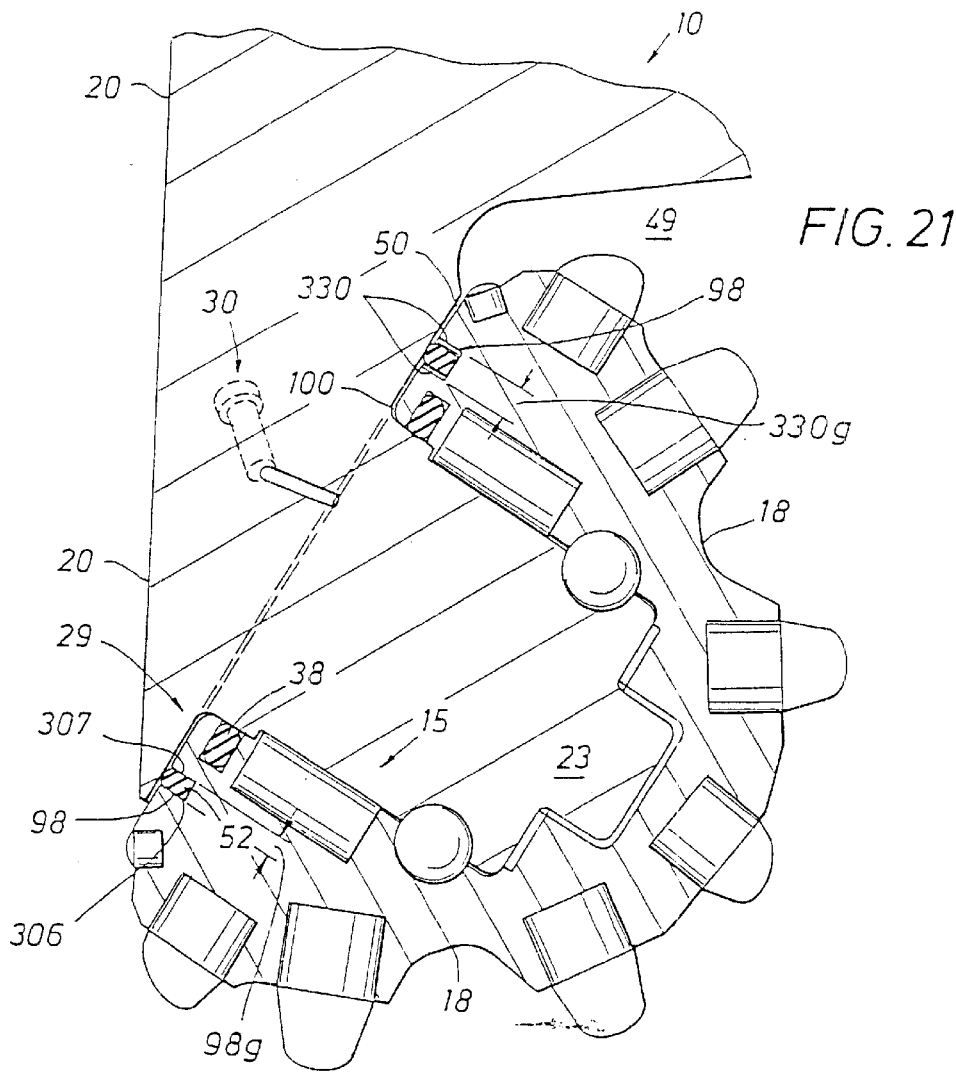
FIG. 21 is a partial cross-sectional view of another embodiment of the present invention employing a secondary seal disposed in a groove having wide portions.
Figure 21A:
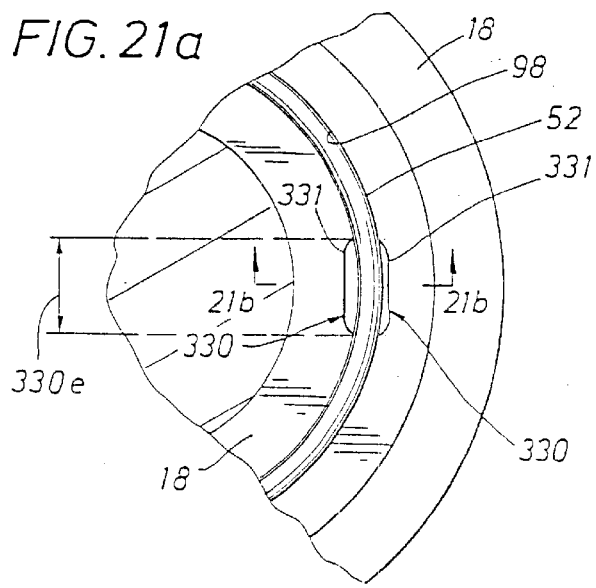
FIG. 21a is a partial plan view of a secondary seal disposed in a groove having wide portions.
Figure 21B:
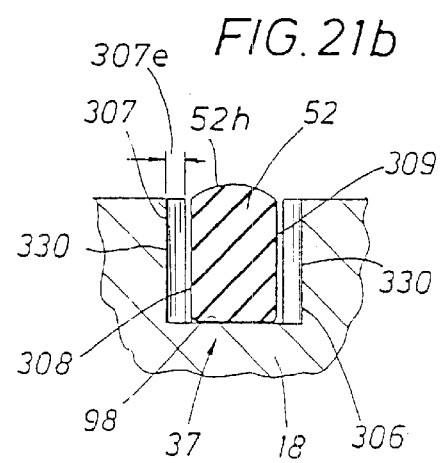
FIG. 21b is a partial cross sectional view of the embodiment of FIG. 21a taken along line 21b—21b.

Now referring to FIGS. 21–21b, still another aspect of the invention allows two-way fluid migration past the secondary seal 52 with the placement of the seal 52 in a groove 98 or an interstice (not shown) having at least one wide region 330. The width 330g (FIG. 21) of the region 330 is greater than the width 98g of circumferentially adjacent regions, or the remainder, of the groove 98 (or interstice). When the differential pressure across the secondary seal 52 changes or reaches a predetermined level or range, the portion 52h (FIG. 21b) of the seal 52 disposed in the groove 98 (or interstice) at the wide region 330 will be pushed away from the side with the higher pressure, either toward the space 100 or the gap 50, and will move or twist, allowing fluid passage in that direction.

The wide region 330 can take any suitable shape and form with any desirable width 330g and length 330e (FIG. 21a), such as to cause fluid migration by the secondary seal 52 at a desired pressure differential value or range. In the embodiment of FIGS. 21–21b, the wide region 330 is created by first and second pockets 331 formed in the non-energizing cone surfaces of the groove 98. Further, as described above with respect to FIG. 17, the seal 52 can be selected to allow for fluid migration at specified differential pressures values or ranges, such as by varying one or more dimensions, or the material properties, of the seal 52. Yet further similarly as described above with respect to FIGS. 17–17c, flow enhancement mechanisms 310a may be included.

Figure 24:
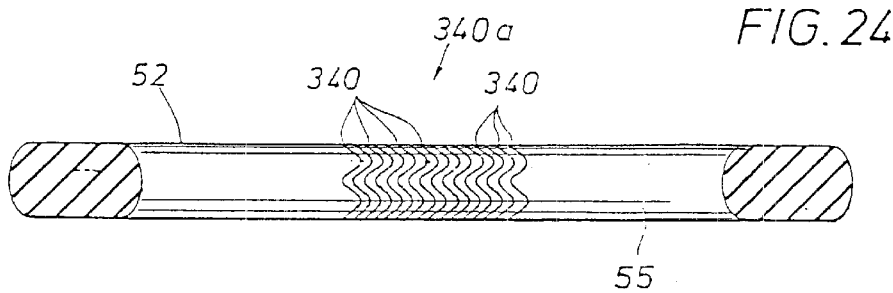
FIG. 24 is another embodiment of the present invention of a secondary seal having fluid leakage depressions in the dynamic sealing surface.
Figure 23:
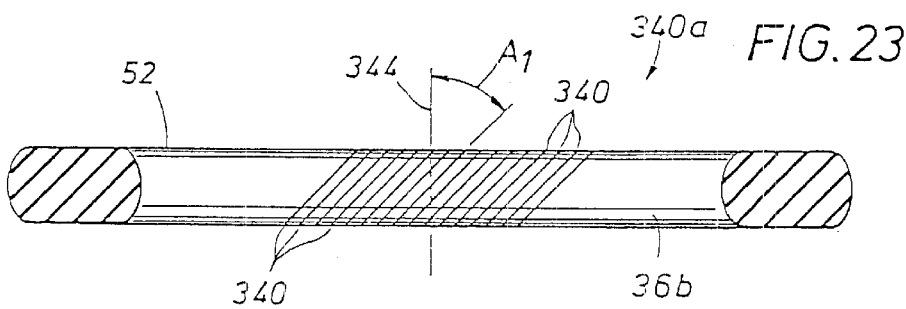
FIG. 23 is another embodiment of the present invention of a secondary seal having fluid leakage depressions in the static sealing surface.
Figure 22:
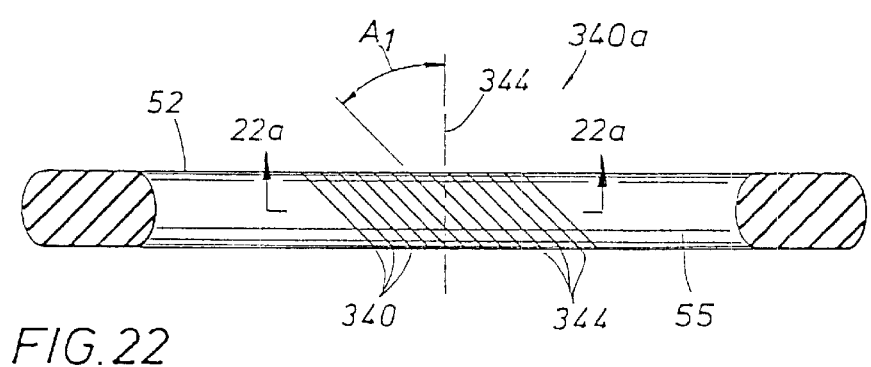
FIG. 22 is an embodiment of the present invention of a secondary seal having fluid leakage depressions in the dynamic sealing surface.

In another aspect of the invention, referring to FIGS. 22–24, two-way fluid migration by the secondary seal 52 may be accomplished by altering one or more regions 340a of one or more of the sealing surfaces of the seal 52, such as the dynamic sealing surface 55 (FIG. 22), the static sealing surface 36b (FIG. 23) and/or one or both of the non-energized surfaces (not shown). The sealing surface in the region 340a may be altered in any suitable manner to allow fluid migration by the seal 52 at the altered region(s) 340a. For example, the altered regions of the seal 52 in FIGS. 22–24 have a plurality of depressions 340 in the subject sealing surface. In FIGS. 22 and 24, the depression 340 are in the dynamic sealing surface 55 of the seal 52, while FIG. 23 shows depression 340 in the static sealing surface 36b of the seal 52. The seal 52 of FIG. 23 could be used, for example, in the dual-seal orientation of FIG. 20. The contact pressure at each depression 340 is lowered (or zero) such that fluid flows past the seal 52 at the depressions 340 at a certain differential pressure, and can, if desired, be designed to allow migration when there is no differential pressure. Other examples of ways to alter the sealing surface in the altered region 340a include forming cut-outs, slits, grooves, pits or any other suitable surface feature or manner of making the sealing surface in the altered region 340a uneven as compared to circumferentially adjacent regions, or the remainder, of the sealing surface to allows fluid migration by the seal 52 without substantially sacrificing the integrity of the seal.

Figure 22A:
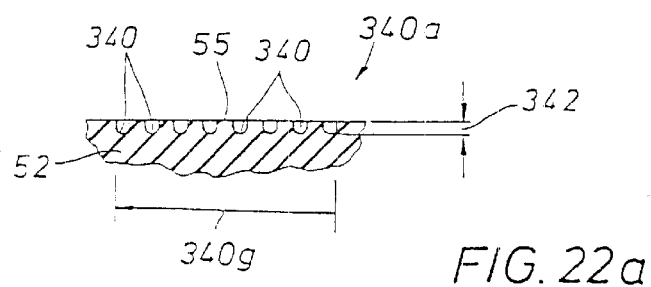

The altered region 340a can be formed such that fluid will flow past the seal 52 at a predetermined value or range of differential pressure. For example, referring to FIG. 22a, the length 340g and depth 342 of the altered region 340a can be selected for such fluid flow as may be desired. A depression depth 342 of 0.005 inches of the embodiment of FIG. 22a, for example, will possess a lower leak rate than a depression 340 having a depth of 0.025 inches. As shown in FIGS. 22 and 23, depressions 340 can be angled relative to a vertical axis 344 through the seal 52. In the preferred embodiment, these depressions 340 are formed at angles $A_1$ of between approximately 0 degrees and approximately 60 degrees relative to the central axis 344 to allow a desired two-way fluid migration by the seal 52. For yet other examples, the quantity and configuration of surface features or cut-outs of the altered region 340a, such as the depressions 340, can be varied as desired to effect the fluid bypass rate of the seal 52 or for other reasons. An example of a seal 52 having depressions 340 with a non-linear shape is shown in FIG. 24.

Further, as described above with respect to FIG. 17, the seal 52 can be selected to allow for fluid migration at specified differential pressures values or ranges, such as by varying one or more dimensions, or the material properties, of the seal 52 in the altered region 340a, the seal 52 or a combination thereof. Similarly as described above with respect to FIGS. 17–17c, flow enhancement mechanisms 310a may be included.

Alternately, or additionally, one or more of the energizing and non-energizing surfaces of the bit components surrounding (and engageable) with the seal 52 can be formed with one or more altered regions (not shown) similarly designed as described above with respect to the altered regions 340a of the seal 52, to allow fluid migration by the secondary seal 52. Thus, the above two-paragraph description regarding altered regions 340a of the seal 52 can be modified by one of ordinary skill in the art to instead apply to one or more of the bit component surfaces surrounding the seal 52.

Now referring to FIGS. 25–25b, still another aspect of the invention allows fluid migration, particularly two-way fluid migration, past the secondary seal 52 with the placement of the seal 52 in a groove 98 or an interstice (not shown) having at least one deep region 350a. The sealing surface (such as static sealing surface 36a and dynamic sealing surface 55 in FIG. 25) of the seal 52 disposed in the groove 98 (or interstice) at the deep region 350a will have a lower contact pressure than the sealing surface on unaltered circumferentially adjacent regions of the seal 52. Thus, when the differential pressure across the secondary seal 52 changes or reaches a predetermined level or range, the lower contact pressure of the sealing surface(s) of the seal 52 at the deep region 350a will allow fluid passage away from the side having the higher pressure and into the space 100 or gap 50, accordingly.

The deep region 350a can take any suitable or desirable shape, form and configuration with any desirable length 356 and difference in depth 354 from the depth of circumferentially adjacent non-altered regions of the groove 98 (or interstice) as to cause fluid migration by the secondary seal 52 at a desired pressure differential value or range. In the embodiment of FIGS. 25–25b, the deep region 350a is an indent, or cut-out, 350 formed in energizing cone surface 302 of the groove 98. Further, similarly as described above with respect to FIG. 17, the seal 52 can be selected to allow for fluid migration at specified differential pressures values or ranges, such as by varying one or more dimensions, or the material properties of the seal 52 in the deep region 350a, the seal 52, or a combination thereof. Yet further similarly as described above with respect to FIGS. 17–17c, flow enhancement mechanisms 310a may be included.

Figure 26:
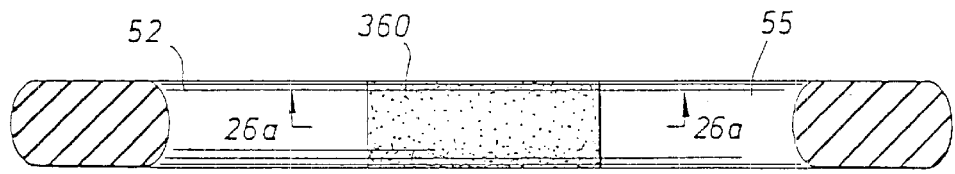
FIG. 26 is an embodiment of the present invention of a secondary seal having a porous inlay.
Figure 26A:
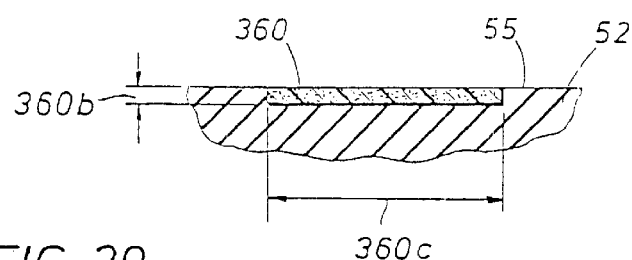

In yet another aspect of the invention, referring to FIGS. 26 and 26a, fluid migration, particularly two-way fluid migration by the secondary seal 52 can be accomplished by including a porous inlay 360 in at least a portion of one of the sealing surfaces of the seal 52. The porous inlay 360, which can be formed, for example, on the dynamic sealing surface 55, the static sealing surface (not shown) or both surfaces, and may extend into the thickness of the seal 52 (FIG. 26a), serves as a migration path for fluid past the seal 52. In the example of FIG. 26, the porous inlay 360 is disposed in a portion of the dynamic sealing surface 55 of the seal 52, which will allow fluid to migrate in the direction away from the side with the higher pressure at a lower differential pressure than the adjacent or unaltered regions of the sealing surface 55. If desired, the seal 52 with porous inlay 360 can also be designed to allow fluid migration in either or both directions when there is no differential pressure.

The size, shape, orientation, location and material composition of the inlay 360 may be selected as desired to allow a particular migration rate, or for other reasons. Examples of materials useful as inlay 360 are wire mesh or screen, fabric, felt or other primarily non-elastomeric material. In FIGS. 26 and 26a, the inlay 360 is constructed of fabric, and is embedded into the seal 52 at a depth of 360b along a length 360c of the dynamic sealing surface 55 of the seal 52. As described above with respect to FIG. 17, the seal 52 can be selected to further allow for fluid migration at specified differential pressures values or ranges, such as by varying one or more dimensions, or the material properties of the seal 52, or a combination thereof. Similarly as described above with respect to FIGS. 17–17c, flow enhancement mechanisms 310a may also be included.

Figure 27:
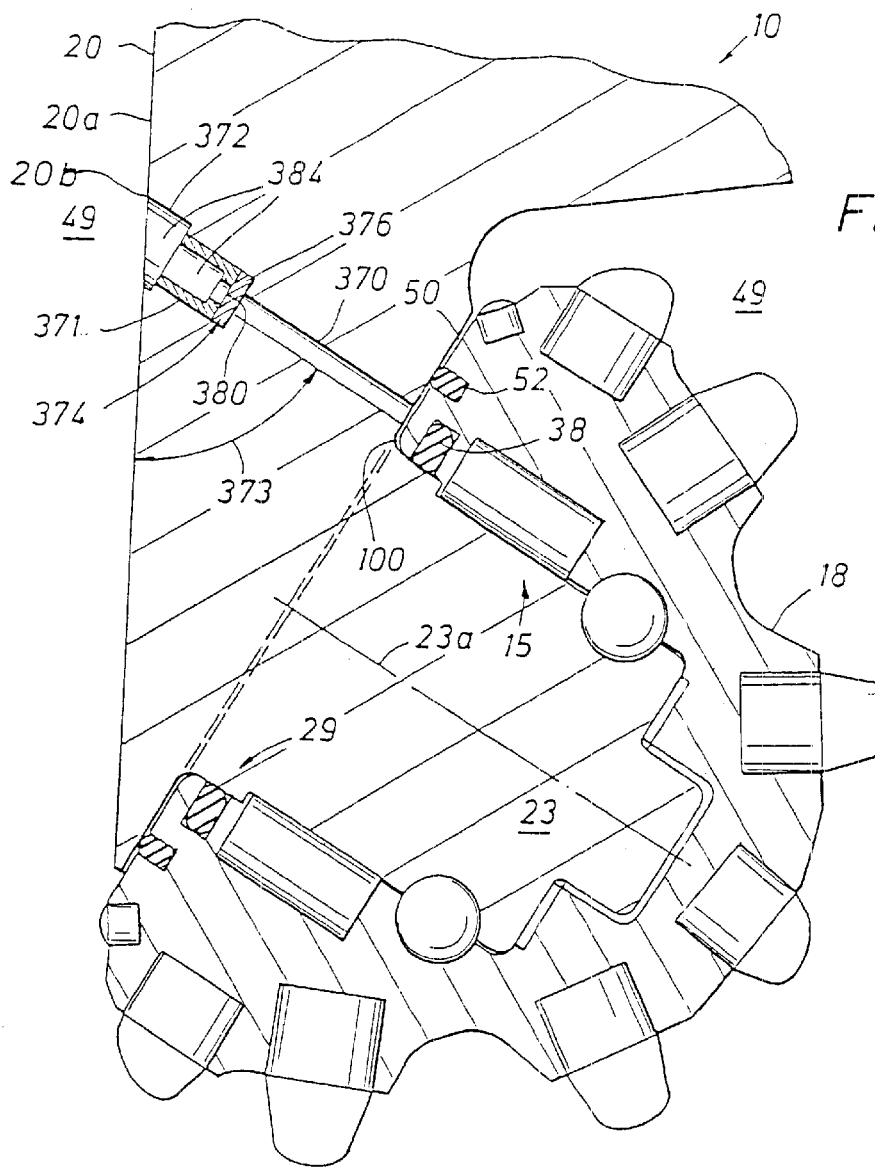
FIG. 27 is a partial cross-sectional view of an embodiment of the present invention employing a conduit extending from the space between the seals to the bit exterior and a fluid control member.
Figures 27A, 27B, 27C:
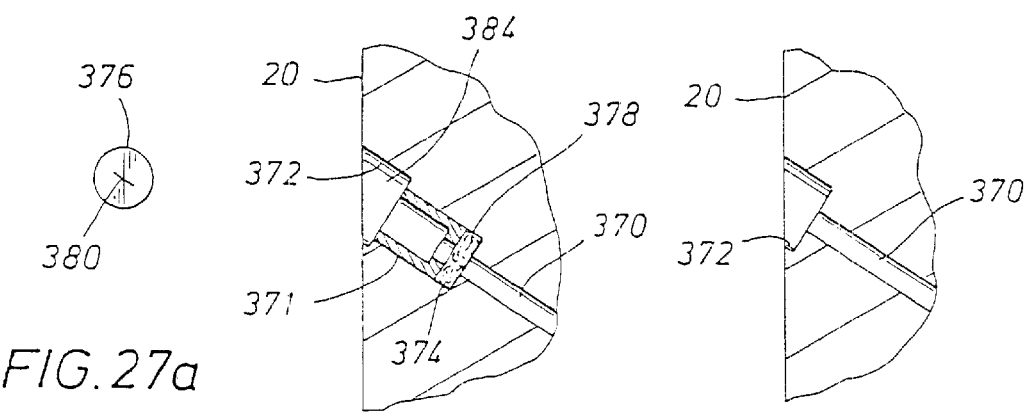
FIG. 27a is a bottom view of the washer of the fluid control member FIG. 27.
FIG. 27b is a partial isolated view of another embodiment of a fluid control member.
FIG. 27c is a partial isolated view of a conduit extending from the space between the seals to the bit exterior.

Now referring to FIGS. 27–27c, in another aspect of the invention, the chamber pressure within the space 100 may be maintained equal to or within a reasonable range of the borehole pressure (not shown) by providing for two-way fluid migration between the space 100 and the bit exterior 49. One technique for achieving this is with the inclusion of one or more passages, or conduits, 370 extending between the space 100 and the bit exterior 49. The conduit 370 allows fluid communication between the space 100 and borehole (not shown) or bit exterior 49 by allowing the flow of incompressible fluid from the space 100 to the bit exterior 49 in one direction, and the flow of drilling fluid from the bit exterior 49 into the conduit 370 in the other direction, depending on the pressure differential.

In the example of FIG. 27, the conduit 370 extends from the space 100 to an opening 20b in the leg surface 20a and is filled with incompressible fluid (not shown), such as the preferred composition as described above. Referring to FIG. 27c, the conduit 370 may be in direct fluid communication with the borehole and thus exposed to the bit exterior 49. The use of viscous, tacky grease, such as the preferred composition of incompressible fluid, acts as a barrier to the substantial ingress of large particles from the bit exterior 49 to the space 100 and primary seal 38. Further, the bit 10 can be designed with the conduit 370 extending to one or more counterbores 371, 372 formed into the leg 20 around the opening 20b. The conduit 370 and counterbores 371, 372 (if included) may take any suitable shape and configuration. For example, in the exemplary embodiment of FIG. 27, the conduit 370, and counterbores 371, 372 engage the leg 20 at an angle of over about 0 degrees and less than about 90 degrees relative to the leg surface 20a. It should be understood that the conduit 370 can extend to an opening 20b on any surface of the leg 20, such as the side surface of the leg 20 indicated in FIG. 25.

Fluid migration through the conduit 370 may be controlled with the inclusion of a fluid control member 374, which may take any suitable form or configuration as desired to allow the fluid migration at a particular rate or range. For example, the control member 374 of FIG. 27 is a perforated washer 376, while the member 374 of FIG. 27b is a filter 378. The fluid control member 374 may further be designed to prevent the ingress of large particles into the conduit(s) 370 from the bit exterior 49.

The washer 376 of FIG. 27 includes one or more perforations 380, which may be sized to control fluid migration or pressure relief at a predetermined range of differential pressure. The washer 376 can be made of a flexible material such as an elastomer, wherein the perforations 380 can be optimized to relieve at a given differential pressure range. In FIG. 27a, for example, the washer 376 has a single perforation 380 in the shape of a slit. The filter 378 of FIG. 27b may be constructed of any suitable material, such as wire, fiber or felt. Further, a plug 384 having an internal cavity, may be secured in the either or both counterbores 371, 372, such as by interference fit, welding, or threads, for various purposes, such as to secure the control member 374 and conduit 370. It should be understood that the control member 374 can take other forms and configurations, such as any among various suitable one-way and two-way valves known in the art and suitable for use in accordance with the present invention. Further, as described above with respect to FIG. 17, the seal 52 can be selected to further allow for fluid migration at specified differential pressures values or ranges, such as by varying one or more dimensions, or the material properties of the seal 52, or a combination thereof. Similarly as described above with respect to FIGS. 17–17c, flow enhancement mechanisms 310a may also be included.

The above aspects and configurations of the present invention may be modified by one of ordinary skill in the art to enable "substantially one-way fluid migration" or "biased two-way fluid migration." "Substantially one-way fluid migration" is migration in one direction with residual, nominal, or normal leakage, migration or backflow in the other direction. "Biased two-way fluid migration" allows migration in one direction, such as from the space 100 to the borehole 17, at a lesser differential pressure or range than migration in the other direction. The bit 10 may thus be designed so that fluid migrates from the space 100 to the gap 50 when the pressure differential caused by a higher chamber pressure in the space 100 is within a certain range, and fluid migration from the gap 50 to the space 100 for a greater pressure differential caused by higher borehole pressure than in the space 100, or vise versa, as desired.

Biased two-way fluid migration or substantially one-way fluid migration may be achieved, for example, by modifying the geometry of the bit component surfaces surrounding the seal 52, or by modifying the seal 52. In one configuration, referring to the embodiment of FIGS. 28–28b, at least one of the bit components surfaces surrounding the seal 52 of the groove or interstice within which the seal 52 is disposed includes at least one wide region 391, or is otherwise uneven with respect to circumferentially adjacent regions of the bit component surface.

Figure 28:
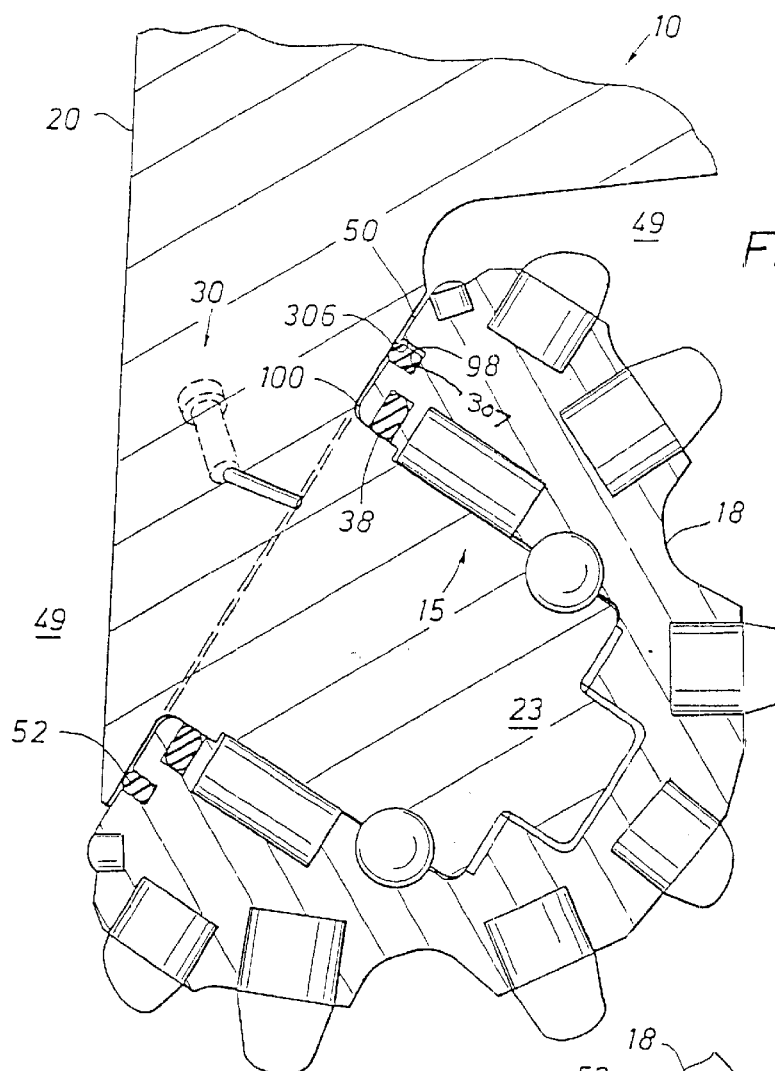
FIG. 28 is a partial cross-sectional view of an embodiment of the present invention employing a secondary seal disposed in a groove having wide region.
Figure 28B:
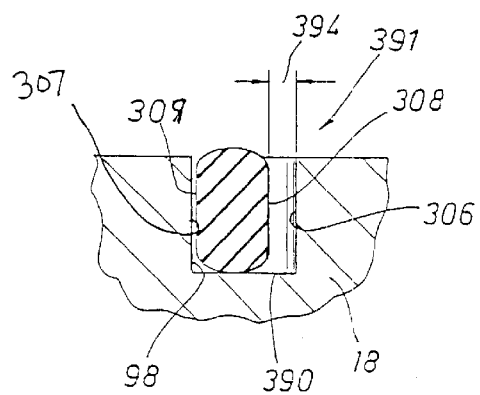
FIG. 28b is a partial cross sectional view of the embodiment of FIG. 28a taken along lines 28b—28b.
Figure 28A:
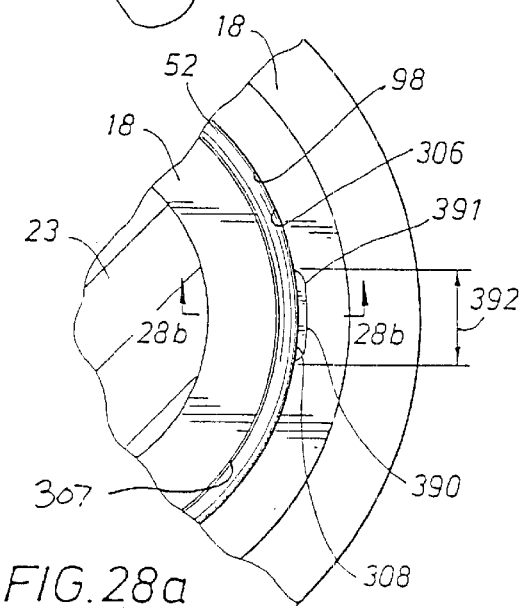
FIG. 28a is a partial plan view of a secondary seal disposed in a groove having a wide region.

In the example of FIGS. 28–28b, the outermost primarily non-energizing surface 306 surrounding the secondary seal 52 includes one or more wide regions 390 adjacent the primarily non-energized side 308 of the seal 52. The wide region 391 is a pocket, or cut out, 390 formed in the cone 18, thus extending the width of the groove 98 at the wide region 391 by the width 394 of the pocket 390. When the chamber pressure in the space 100 exceeds the pressure in the borehole (not shown) or bit exterior 49, such as within a certain predetermined range, the portion of the seal 52 disposed in the groove 98 at the wide region 391 will be drawn toward the gap 50 and will move, twist, or otherwise yield, allowing the passage of fluid from the space 100 to the gap 50. A higher differential pressure (where the borehole pressure exceeds the chamber pressure) will be necessary to cause the seal 52 to allow migration of fluid in the opposite direction, if at all.

The wide, or uneven, region 391 can take any shape, form or configuration as desired, and the length 392 and width 394 of the wide region 391, or pocket 390 of FIG. 28, can be selected to allow fluid migration by the seal 52 within specific differential pressure ranges, if desired. Further, as described above with respect to FIG. 17, the seal 52 can also be selected to allow for fluid migration at specified differential pressures values or ranges, such as by varying one or more dimensions, or the material properties of the seal 52 in the wide region 390, in the seal 52 or a combination thereof. Yet further similarly as described above with respect to FIGS. 17–17c, flow enhancement mechanisms 310a may be included.

Figure 29:
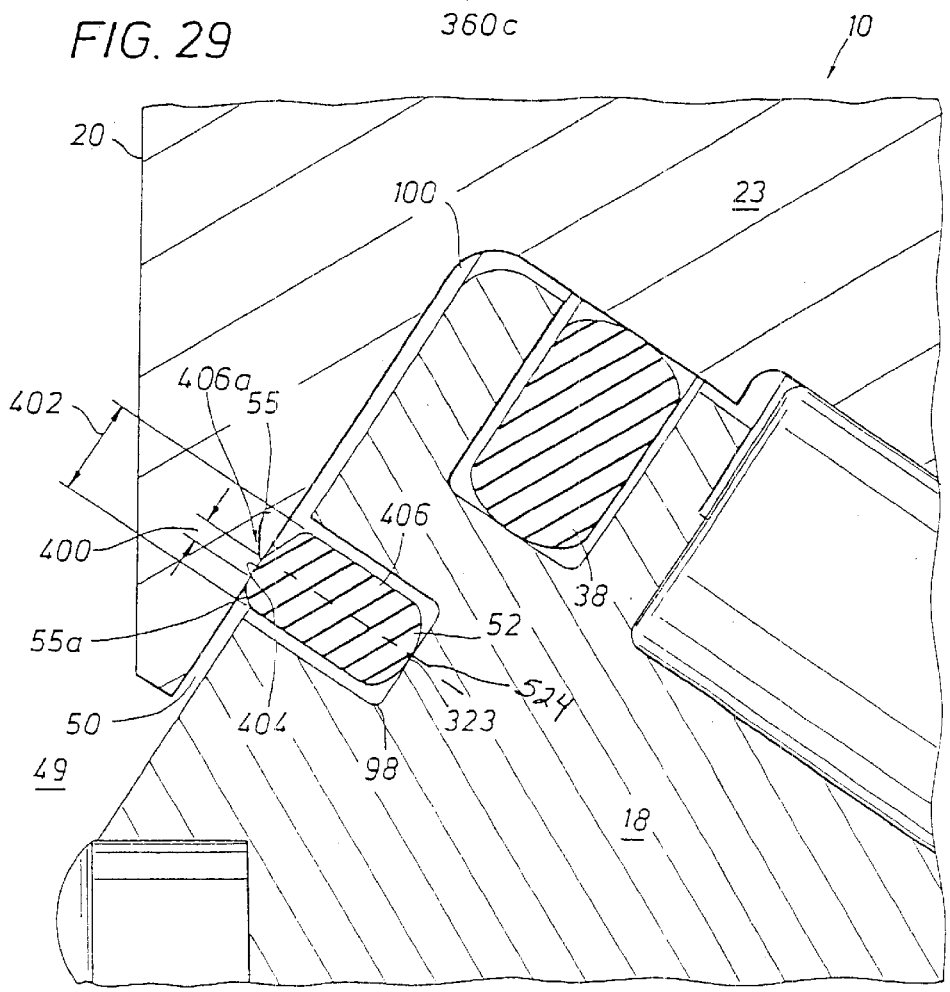
FIG. 29 is a partial cross-sectional view of an embodiment of the present invention having a modified secondary seal with a non-symmetrical dynamic sealing surface.

In another aspect of the present invention, referring to FIG. 29, the seal 52 can be modified to allow biased two-way fluid migration, or substantially one-way fluid migration, by the secondary seal 52. The seal 52 can be modified to allow such migration past the static 323 or dynamic 55 sealing surfaces, the non-energizing surfaces, or a combination thereof, and regardless of whether the seal 52 is in a groove 98 or interstice (not shown). In the example of FIG. 29, the seal 52 is shown located in groove 98 in the cone 18 and having an at least partially non-symmetrical cross-sectional region 406a upon which a portion of the dynamic sealing surface 55 is formed. It should be understood that there can be one or numerous such regions 406a, or the entire seal 52 can have an at least partially or fully non-symmetrical cross-section. The surface 55 has a contact width 400 smaller than the width 402 of the seal 52 (as well as the width of the circumferentially adjacent regions of the dynamic sealing surface 55).

When the differential pressure on the seal 52 falls within a certain range, the contacting portion 404 of the seal will deform into the body 406 of the seal 52, move within the groove 98, or otherwise yield, allowing fluid migration by the seal 52.

Still referring to the example FIG. 29, the non-symmetrical region 406a of the seal 52 is oriented or shaped such it is not symmetrical relative to the seal axis 524. As a result, the contacting portion 404 of the seal 52 is off-center, or proximate to the gap 50. Thus, the distance from the contacting portion 404 to the gap 50 in FIG. 29 is smaller than the distance from the contacting portion 404 to the space 100. With this type of configuration, the differential pressure caused by higher chamber pressure in the space 100 sufficient to cause fluid migration from the space 100 to the gap 50 will be lower than the differential pressure caused by higher borehole pressure necessary to cause fluid migration into the space 100 from the gap 50. Further, as described above with respect to FIG. 17, the seal 52 can be selected to further allow for fluid migration at specified differential pressures values or ranges, such as by varying one or more dimensions, or the material properties of the seal 52, or a combination thereof. Similarly as described above with respect to FIGS. 17–17c, flow enhancement mechanisms 310a may also be included.

Figure 30:
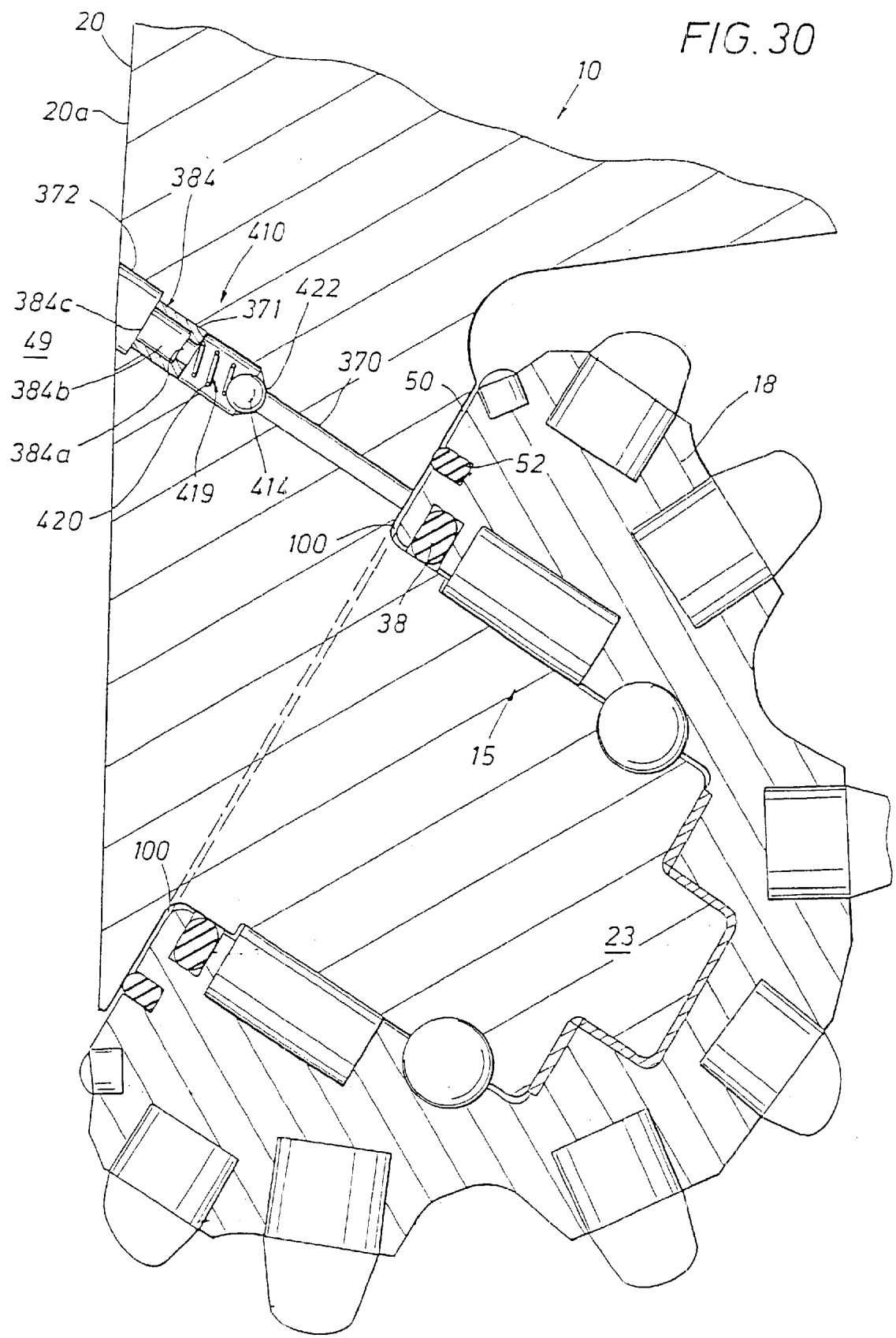
FIG. 30 is a partial cross-sectional view of an embodiment of the present invention having a conduit extending from the space between the seals to the bit exterior and a substantially one-way fluid valve.

In yet another aspect of the invention, biased two-way fluid migration, or substantially one-way fluid migration from the space 100 to the bit exterior 49 can be achieved with the use of a conduit 370, such as the conduit 370 of FIG. 27, but also including a primarily one-way valve. For example, the embodiment of FIG. 30 includes a one-way valve 410 of any suitable form in fluid communication with the conduit 370 and bit exterior 49. One type of valve 410 includes a ball 414 and biasing member 419, such as a spring 420, disposed in a counterbore 371. The spring 420 biases the ball 414 against the conduit opening 422. When the pressure in the space 100 and conduit 370 reach a sufficient level higher than the borehole pressure, the ball 414 is pushed into the counterbore 371, compressing the spring 420 and allowing fluid flow from the conduit 370 to the borehole, or bit exterior 49. The ball 414 and spring 420 may be secured in the counterbore 371 with a plug 384 having an internal cavity 384b and openings 384a, 384c to allow the flow of fluid therethrough. The valve 410 can be designed to disallow migration of fluid in the other direction, or to allow such fluid migration at a particular differential pressure value or range. It should be understood that the one-way valve 410 and passage 310 configuration can take any other suitable form. Further, as described above with respect to FIG. 17, the seal 52 can be selected to further allow for fluid migration at specified differential pressures values or ranges, such as by varying one or more dimensions, or the material properties of the seal 52, or a combination thereof. Similarly as described above with respect to FIGS. 17–17c, flow enhancement mechanisms 310a may also be included.

Biased two-way fluid migration or substantially one-way fluid migration may be useful, for example, in drilling conditions where it is desired to minimize the ingress of particles, debris or fluid from the bit exterior 49 to the space 100 or primary seal 38. Further, biased two-way fluid migration configurations may be used in combination with other pressure communication mechanisms. For example, the example of FIGS. 28–28b, can be used in conjunction with a pressure relief conduit 370 such as shown in FIGS. 27–27c, or a primarily one-way pressure relief conduit (not shown) that primarily allows the flow of drilling fluid into the bit 10.

Each of the foregoing aspects and features of the invention may be used alone or in combination with other such aspects and features. For example, two substantially one-way fluid migration mechanisms can be used to achieve two-way fluid migration, as well as with other pressure communication techniques and mechanisms that are or become known in the art. For another example, flow enhancement mechanisms as described with respect to FIG. 17 can be used with any above aspect. The embodiments described herein are exemplary only and are not limiting of the claimed invention, and modifications thereof can be made by one skilled in the art without departing from the spirit or teachings of this invention. For example, with respect to the aspects of the invention involving the migration of fluid by the secondary seal 52, various additional factors, such as the material properties of the seal 52, can be selected to effect the ability of the seal 52 to allow fluid migration. Further, each of the above aspects of the invention can be used regardless of the direction of energization of the secondary seal 52, are applicable to the static and dynamic sealing surfaces of the seal 52, are applicable when the seal 52 is in a groove in the cone 18, leg 20 or leg journal segment 23, or in an interstice, and can be used on or in connection with one or more portions of the seal 52, or around the entire circumference of the seal 52. Many variations and modifications of the embodiments described herein are thus possible and within the scope of the invention. Accordingly, the scope of protection is not limited to the embodiments described herein.

What is claimed is:

1. A drill bit for use in a borehole at least partially containing drilling fluid, comprising:
    a bit body having at least two bit components, said bit components including at least one leg, said leg having a journal segment, said bit components further including a roller cone rotatably mounted upon said journal segment and forming at least one bearing cavity therebetween;
    an annular primary seal disposed between said leg and said roller cone; and
    an annular secondary seal disposed between said leg and said roller cone and between said annular primary seal and the borehole, said annular secondary seal having a sealing surface engageable with at least one said bit component, said sealing surface having first and second adjacent regions, wherein the thickness of said annular secondary seal at said first region of said sealing surface is greater than the thickness of said annular secondary seal at said second region of said sealing surface such that said annular secondary seal can deform at said second region of said sealing surface so as to allow the passage of to assist in the migration of fluid into the borehole past said secondary seal.

2. The drill bit of claim 1 wherein said sealing surface is a primarily dynamic sealing surface.

3. The drill bit of claim 1 wherein said sealing surface is a primarily static sealing surface.

4. A drill bit for use in a borehole at least partially containing drilling fluid, comprising:
    a bit body having at least two bit components, said bit components including at least one leg, said leg having a journal segment, said bit components further including a roller cone rotatably mounted upon said journal segment and forming at least one bearing cavity therebetween;
    an annular primary seal disposed between said leg and said roller cone; and
    an annular secondary seal disposed between said leg and said roller cone and between said annular primary seal and the borehole, said annular secondary seal having a sealing surface engageable with at least one said bit component, said sealing surface having first and second adjacent regions, wherein the thickness of said annular secondary seal at said first region of said sealing surface is greater than the thickness of said annular secondary seal at said second region of said sealing surface, wherein said annular secondary seal includes first and second side surfaces adjacent to said sealing surface, further wherein at least one of said bit components includes at least one non-energizing surface at least partially engageable with one of said first and second side surfaces of said annular secondary seal, wherein at least one of said first and second side surfaces of said annular secondary seal and said non-energizing surface of said bit component includes first and second sections, wherein said first section is uneven with respect to said second section.

5. The drill bit of claim 4 wherein said first section includes at least one surface feature.

6. A drill bit for use in a borehole at least partially containing drilling fluid, comprising:
    a bit body having at least two bit components, said bit components including at least one leg, said leg having a journal segment, said bit components further including a roller cone rotatably mounted upon said journal segment and forming at least one bearing cavity therebetween;
    an annular primary seal disposed between said leg and said roller cone; and
    an annular secondary seal disposed between said leg and said roller cone and between said annular primary seal and the borehole, said annular secondary seal having a sealing surface engageable with at least one said bit component, said sealing surface having first and second adjacent regions, wherein the thickness of said annular secondary seal at said first region of said sealing surface is greater than the thickness of said annular secondary seal at said second region of said sealing surface, wherein said annular secondary seal includes a lip, wherein said second region of said sealing surface is formed on said lip.

7. The drill bit of claim 6 wherein said lip is at least partially bellows-shaped.

8. A drill bit for use in a borehole at least partially containing drilling fluid, comprising:
- a bit body having at least two bit components, said bit components including at least one leg, said leg having a journal segment, said bit components further including a roller cone rotatably mounted upon said journal segment and forming at least one bearing cavity therebetween;
- an annular primary seal disposed between said leg and said roller cone; and
- an annular secondary seal disposed between said leg and said roller cone and between said annular primary seal and the borehole, said annular secondary seal including at least one region having a tapered cross-section, thereby allowing said annular secondary seal to deform at said region having a tapered cross-section so as to allow the migration of fluid into the borehole past the secondary seal.

9. The drill bit of claim 8 wherein said at least one region of said annular secondary seal includes an outer surface, said annular secondary seal including a primarily dynamic sealing surface, wherein at least a portion of said primarily dynamic sealing surface is disposed on said outer surface of said region having a tapered cross-section.

10. The drill bit of claim 8 wherein said at least one region of said annular secondary seal includes an outer surface, said annular secondary seal including a primarily static sealing surface, wherein at least a portion of said primarily static sealing surface is disposed on said outer surface of said region having a tapered cross-section.

11. A drill bit for use in a borehole at least partially containing drilling fluid, comprising:
- a bit body having at least two bit components, said bit components including at least one leg, said leg having a journal segment, said bit components further including a roller cone rotatably mounted upon said journal segment and forming at least one bearing cavity therebetween;
- an annular primary seal disposed between said leg and said roller cone; and
- an annular secondary seal disposed between said leg and said roller cone and between said annular primary seal and the borehole, said annular secondary seal including at least one region having a tapered cross-section, wherein said annular secondary seal includes first and second side surfaces adjacent to said sealing surface, further wherein at least one of said bit components includes at least one non-energizing surface at least partially engageable with one of said first and second side surfaces of said annular secondary seal, wherein at least one of said first and second side surfaces of said annular secondary seal and said non-energizing surface of said bit component includes first and second sections, wherein said first section is uneven with respect to said second section.

12. The drill bit of claim 11 wherein said first section includes at least one surface feature.

13. A drill bit for use in a borehole at least partially containing drilling fluid, comprising:
- a bit body having at least two bit components, said bit components including at least one leg, said leg having a journal segment, said bit components further including a roller cone rotatably mounted upon said journal segment and forming at least one bearing cavity therebetween;
- an annular primary seal disposed between said leg and said roller cone; and
- an annular secondary seal disposed between said leg and said roller cone and between said annular primary seal and the borehole, wherein the cross-section of said annular secondary seal is tapered around the entire circumference of said annular secondary seal such that said secondary seal can deform at said tapered cross-section so as to allow the migration of fluid into the borehole past said secondary seal.

* * * * *